United States Patent
Yu et al.

(10) Patent No.: US 10,031,391 B2
(45) Date of Patent: Jul. 24, 2018

(54) DISPLAY DEVICE AND LIQUID CRYSTAL DISPLAY PANEL HAVING A PLURALITY OF COMMON ELECTRODES

(71) Applicant: Novatek Microelectronics Corp., Hsinchu (TW)

(72) Inventors: Teng-Jui Yu, Taoyuan (TW); Li-Tang Lin, Hsinchu (TW); Chia-Wei Su, Hsinchu (TW); Chu-Ya Hsiao, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 140 days.

(21) Appl. No.: 15/088,146

(22) Filed: Apr. 1, 2016

(65) Prior Publication Data

US 2016/0216587 A1    Jul. 28, 2016

Related U.S. Application Data

(63) Continuation-in-part of application No. 14/074,730, filed on Nov. 8, 2013, now Pat. No. 9,305,504.

(30) Foreign Application Priority Data

Sep. 6, 2013 (TW) .............................. 102132253 A

(51) Int. Cl.
*G02F 1/133* (2006.01)
*G02F 1/1362* (2006.01)
*G02F 1/1343* (2006.01)
*G09G 3/36* (2006.01)

(52) U.S. Cl.
CPC ...... *G02F 1/136286* (2013.01); *G09G 3/3648* (2013.01); *G02F 1/134309* (2013.01); *G02F 2001/13629* (2013.01); *G09G 3/3614* (2013.01)

(58) Field of Classification Search
CPC .................................................. G02F 1/13306
See application file for complete search history.

(56) References Cited

U.S. PATENT DOCUMENTS

| | | | |
|---|---|---|---|
| 6,999,049 | B2 | 2/2006 | Hirota |
| 7,321,355 | B2 | 1/2008 | Lee et al. |
| 7,800,579 | B2 | 9/2010 | Lee et al. |
| 7,973,757 | B2 | 7/2011 | Lee et al. |

(Continued)

FOREIGN PATENT DOCUMENTS

| | | |
|---|---|---|
| CN | 1381758 | 11/2002 |
| CN | 101236318 | 8/2008 |

(Continued)

OTHER PUBLICATIONS

"Office Action of China Counterpart Application", dated Nov. 28, 2016, p. 1-p. 7.

*Primary Examiner* — Phu Vu
(74) *Attorney, Agent, or Firm* — JCIPRNET

(57) ABSTRACT

A liquid crystal display panel and a display device are provided. The liquid crystal display includes a first common electrode, a second common electrode and pixels. The second common electrode and the first common electrode are electrically independent from each other. First pixels of the pixels are coupled to the first common electrode, and second pixels of the pixels are coupled to the second common electrode. Accordingly, usage or operation of the liquid crystal display panel is more flexible.

23 Claims, 20 Drawing Sheets

(56) References Cited

U.S. PATENT DOCUMENTS

| | | |
|---|---|---|
| 2002/0158826 A1 | 10/2002 | Hirota |
| 2004/0192641 A1 | 9/2004 | Liu |
| 2008/0088575 A1 | 4/2008 | Lee et al. |
| 2010/0110057 A1 | 5/2010 | Lee et al. |
| 2010/0321358 A1 | 12/2010 | Lee et al. |
| 2011/0193769 A1 | 8/2011 | Ohgami et al. |
| 2014/0313113 A1* | 10/2014 | Jang .................. G09G 3/3614 345/87 |

FOREIGN PATENT DOCUMENTS

| | | |
|---|---|---|
| CN | 102542965 | 7/2012 |
| CN | 102998858 | 3/2013 |
| CN | 104424897 | 3/2015 |
| JP | H0815723 | 1/1996 |
| JP | 2008134338 | 6/2008 |
| JP | 2008233416 | 10/2008 |
| KR | 20050118812 | 12/2005 |
| TW | 200417974 | 9/2004 |

\* cited by examiner

DISPLAY DEVICE AND LIQUID CRYSTAL DISPLAY PANEL HAVING A PLURALITY OF COMMON ELECTRODES

CROSS-REFERENCE TO RELATED APPLICATION

This application is a continuation-in-part application of and claims the priority benefit of a prior application Ser. No. 14/074,730, filed on Nov. 8, 2013, now allowed. The prior application Ser. No. 14/074,730 claims the priority benefit of Taiwan application serial no. 102132253, filed on Sep. 6, 2013. The entirety of each of the above-mentioned patent applications is hereby incorporated by reference herein and made a part of this specification.

BACKGROUND OF THE INVENTION

Field of the Invention

The invention relates to a display technology, and more particularly, to a display device and a liquid crystal display panel.

Description of Related Art

Generally, a liquid crystal display panel includes a plurality of pixels arranged in a matrix. The pixels are coupled to data lines and scan lines. Voltage on the scan lines is configured to control a switch element in the pixel, and voltage on the data lines is configured to be applied to a terminal of a pixel capacitor in the pixel. Another terminal of the pixel capacitor is coupled to a common electrode, and a potential difference between the two terminals of the pixel capacitor can be used to change a rotating angle of a liquid crystal, thereby changing a color or a brightness displayed by the liquid crystal display panel. The potential difference of the pixel capacitor can be changed by changing a potential on the common electrode. The potential on the common electrode are different based on different operations. Therefore, it has become one major concern for persons skilled in the art in designing a circuitry within the liquid crystal display panel in which usage or operation of the liquid crystal display panel can be more flexible.

SUMMARY OF THE INVENTION

The invention is directed to a liquid crystal display panel and a display device using the liquid crystal display panel, in which usage or operation of the liquid crystal display panel can be more flexible.

In an exemplary embodiment of the invention, a liquid crystal display panel includes a plurality of common electrode chains and a plurality of pixels. Each of the common electrode chains includes a plurality of common electrode groups. Each of the common electrode groups includes at least two common electrodes. Each of the pixels is coupled to a corresponding common electrode of the common electrodes. The common electrode chains are arranged in a predetermined direction, which is selected from one of a first direction and a second direction. Voltages of two neighboring common electrode chains of the common electrode chains are independently configured. The at least two common electrodes of each common electrode group are arranged in the first direction. At least one intrawire connects the at least two common electrodes along the first direction. A common electrode group of pixels located on a (i+1)th data line is coupled to a common electrode group of pixels located on a ith data line via an interwire, and i is a positive integer.

In an exemplary embodiment of the invention, the common electrode group of the pixels located on the (i+1)th data line is coupled to another common electrode group of pixels located on the ith data line via another interwire.

In an exemplary embodiment of the invention, the pixels of the common electrode group located on the (i+1)th data line are located on a first group of scan lines. The pixels of the common electrode group located on the ith data line are located on a second group of scan lines comprising scan lines different from the first group of scan lines. The pixels of the another common electrode group located on the ith data line are located on a third group of scan lines different from the first group and the second group of scan lines.

In an exemplary embodiment of the invention, a common electrode of the common electrode group of the pixel located on the (i+1)th data line and a (j+k+1)th scan line is coupled to a common electrode of the common electrode group of the pixel located on the ith data line and a (j+k)th scan line via the interwire. A common electrode of the common electrode group of the pixel located on the (i+1)th data line and a (j+2k)th scan line is coupled to a common electrode of the common electrode group of the pixel located on the ith data line and a (j+2k+1)th scan line via another interwire, and j and k are positive integers.

In an exemplary embodiment of the invention, the common electrode group of the pixels located on the (i+1)th data line is coupled to a common electrode group of pixels located on a (i+2)th data line via another interwire.

In an exemplary embodiment of the invention, the pixels of the common electrode group located on the (i+1)th data line are located on a first group of scan lines. The pixels of the common electrode group located on the ith data line are located on a second group of scan lines comprising scan lines different from the first group of scan lines. The pixels of the common electrode group located on the (i+2)th data line are located on the second group of scan lines.

In an exemplary embodiment of the invention, a common electrode of the common electrode group of the pixel located on the (i+1)th data line and a (j+k+1)th scan line is coupled to a common electrode of the common electrode group of the pixel located on the ith data line and a (j+k)th scan line via the interwire. A common electrode of the common electrode group of the pixel located on the (i+1)th data line and the (j+k+1)th scan line is coupled to a common electrode of the common electrode group of the pixel located on the i+2th data line and the (j+k)th scan line via another interwire, and j and k are positive integers.

In an exemplary embodiment of the invention, a liquid crystal display panel includes a plurality of first common electrodes, a plurality of second common electrodes and a plurality of pixels. Voltage of the first electrodes and voltage of the second electrodes are independently configured. Each of the pixels is coupled to a common electrode which is either the first common electrode or the second common electrode. The first common electrode of a pixel located on a ith data line and a jth scan line is directly coupled to the first common electrode of a pixel located on the ith data line and a (j+2)th scan line through a first wire. The second common electrode of a pixel located on the ith data line and a (j+1)th scan line is directly coupled to the second common electrode of a pixel located on the ith data line and a (j+3)th scan line through a second wire. The first wire is distinct from the second wire, and i and j are positive integers.

In an exemplary embodiment of the invention, the second common electrode of a pixel located on a (i+1)th data line and the jth scan line is directly coupled to the second common electrode of a pixel located on the (i+1)th data line and the (j+2)th scan line through a third wire. The first common electrode of a pixel located on the (i+1)th data line and the (j+1)th scan line is directly coupled to the first common electrode of a pixel located on the (i+1)th data line and the (j+3)th scan line through a fourth wire. The third wire is distinct from the fourth wire, and the second wire and the third wire are neighboring.

In an exemplary embodiment of the invention, the second wire and the third wire are coupled.

In an exemplary embodiment of the invention, the second common electrode of a pixel located on a (i+1)th data line and the jth scan line is directly coupled to the second common electrode of a pixel located on the (i+1)th data line and the (j+2)th scan line through a third wire. The first common electrode of a pixel located on the (i+1)th data line and the (j+1)th scan line is directly coupled to the first common electrode of a pixel located on the (i+1)th data line and the (j+3)th scan line through a fourth wire. The third wire is distinct from the fourth wire, and the second wire and the fourth wire are neighboring.

In an exemplary embodiment of the invention, the first common electrode of a pixel located on a (i+1)th data line and the (j+1)th scan line is directly coupled to the first common electrode of a pixel located on the (i+1)th data line and the (j+3)th scan line through a third wire. The second common electrode of a pixel located on the (i+1)th data line and the jth scan line is directly coupled to the second common electrode of a pixel located on the (i+1)th data line and the (j+2)th scan line through a fourth wire. The third wire is distinct from the fourth wire, and the first wire and the third wire are neighboring.

In an exemplary embodiment of the invention, the first wire and the third wire are coupled.

In an exemplary embodiment of the invention, the first wire and the second wire are disposed in the same layer as that the first common electrodes and the second common electrodes are disposed. The first wire and the second wire are disposed on a region excluding the first common electrodes and second common electrodes.

In an exemplary embodiment of the invention, the first wire and the second wire are disposed in a layer different from that the first common electrodes and the second common electrode are disposed.

In an exemplary embodiment of the invention, a liquid crystal display panel includes a plurality of first common electrodes, a plurality of second common electrodes, and a plurality of pixels. Voltage of the first electrodes and voltage of the second electrodes are independently configured. Each of the pixels is coupled to a common electrode which is either the first common electrode or the second common electrode. The first common electrode of a pixel located on a ith data line and a jth scan line is directly coupled to the first common electrode of a pixel located on a (i+2)th data line and a jth scan line through a first wire. The second common electrode of the pixel located on a (i+1)th data line and the jth scan line is directly coupled to the second common electrode of a pixel located on an (i+3)th data line and the jth scan line through a second wire. The first wire is distinct from the second wire, and i and j are positive integers.

In an exemplary embodiment of the invention, the second common electrode of a pixel located on the ith data line and a (j+1)th scan line is directly coupled to the second common electrode of a pixel located on the (i+2)th data line and the (j+1)th scan line through a third wire. The first common electrode of a pixel located on the (i+1)th data line and the (j+1)th scan line is directly coupled to the first common electrode of a pixel located on the (i+3)th data line and the (j+1)th scan line through a fourth wire. The third wire is distinct from the fourth wire, and the second wire and the third wire are neighboring.

In an exemplary embodiment of the invention, the second wire and the third wire are coupled.

In an exemplary embodiment of the invention, the second common electrode of a pixel located on the ith data line and a (j+1)th scan line is directly coupled to the second common electrode of a pixel located on the (i+2)th data line and the (j+1)th scan line through a third wire. The first common electrode of a pixel located on the (i+1)th data line and the (j+1)th scan line is directly coupled to the first common electrode of a pixel located on the (i+3)th data line and the (j+1)th scan line through a fourth wire. The third wire is distinct from the fourth wire, and the second wire and the fourth wire are neighboring.

In an exemplary embodiment of the invention, the first common electrode of a pixel located on the (i+1)th data line and a (j+1)th scan line is directly coupled to the first common electrode of a pixel located on the (i+3)th data line and the (j+1)th scan line through a third wire. The second common electrode of a pixel located on the ith data line and the (j+1)th scan line is directly coupled to the second common electrode of a pixel located on the (i+2)th data line and a (j+1)th scan line through a fourth wire. The third wire is distinct from the fourth wire, and the first wire and the third wire are neighboring.

In an exemplary embodiment of the invention, the first wire and the third wire are coupled.

In an exemplary embodiment of the invention, the first wire and the second wire are disposed in the same layer as that the first common electrodes and the second common electrodes are disposed. The first wire and the second wire are disposed on a region excluding the first common electrodes and second common electrodes.

In an exemplary embodiment of the invention, the first wire and the second wire are disposed in a layer different from that the first common electrodes and the second common electrode are disposed.

In summary, in the display device and the liquid crystal display panel provided in the exemplary embodiments of the invention, more than two common electrodes are disposed. Accordingly, usage or operation of the liquid crystal display panel is more flexible.

To make the above features and advantages of the disclosure more comprehensible, several embodiments accompanied with drawings are described in detail as follows.

DESCRIPTION OF THE EMBODIMENTS

Figure 1:
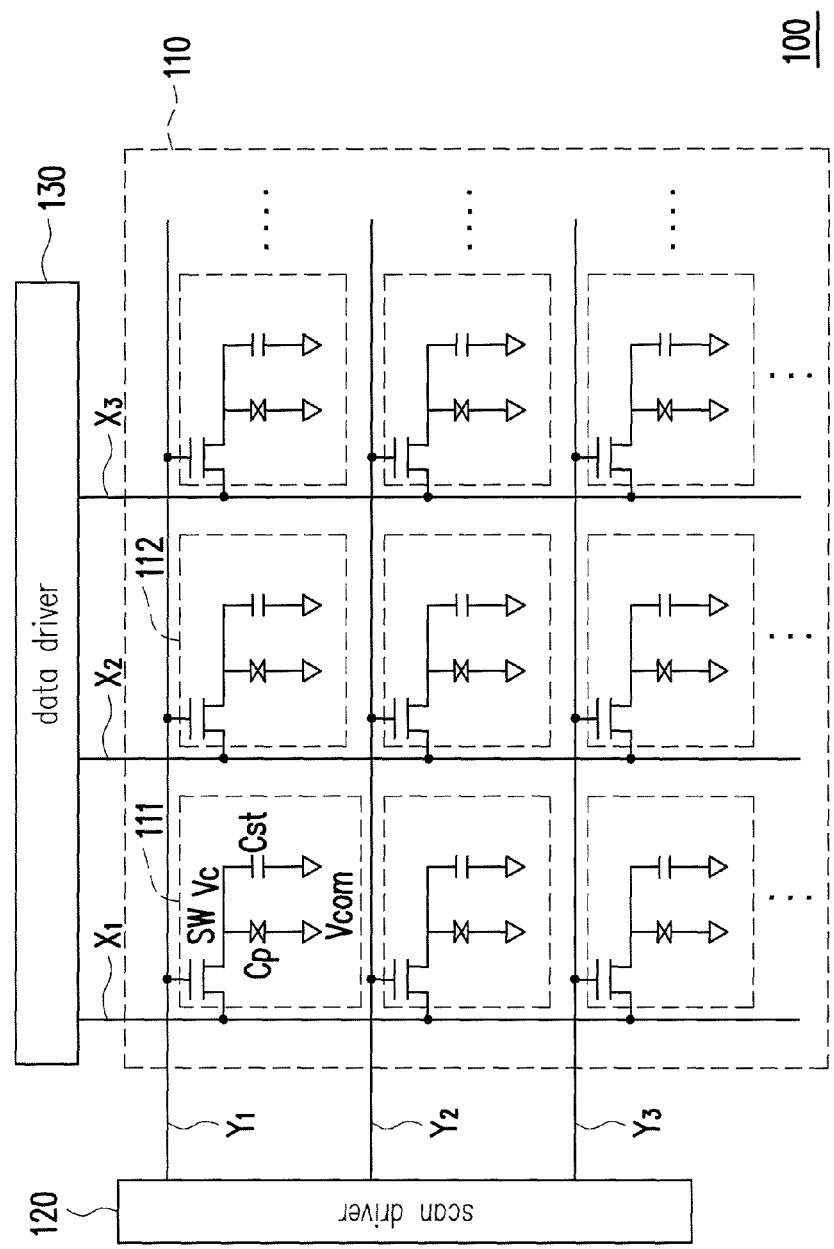
FIG. 1 is a schematic diagram illustrating functional blocks of a display device according to an exemplary embodiment.

FIG. 1 is a schematic diagram illustrating functional blocks of a display device according to an exemplary embodiment. Referring to FIG. 1, a display device 100 includes a liquid crystal display panel 110, a scan driver 120 and a data driver 130. The display device 100 may be any electronic devices including televisions, computers, cell phones, digital cameras, but the invention is not limited thereto.

The liquid crystal display panel 110 includes a plurality of scan lines (Y1, Y2 and Y3) and a plurality of data lines (X1, X2 and X3). The scan driver 120 is coupled to the scan lines Y1 to Y3. The data driver 130 is coupled to the data lines X1 to X3. The liquid crystal display panel 110 further includes a plurality of pixels, and each of the pixels is located on one or more scan lines and one ore more data lines. For instance, a pixel 111 is disposed on the scan line Y1 and the data line X1. Herein, the pixel 111 is illustrated as an example, and other pixels can refer to the same description for the pixel 111. Each of the pixels (e.g., the pixel 111) includes a switch element SW, a storage capacitor Cst and a pixel capacitor Cp (a.k.a. liquid crystal capacitor). In addition, the switch element SW can be a thin film transistor (TFT) or other controlled switches. A first terminal of the switch element SW is coupled to the data line X1, and a control terminal of the switch element SW is coupled to the scan line Y1. First terminals of the pixel capacitor Cp and the storage capacitor Cst are coupled to a second terminal of the switch element SW, and second terminals of the pixel capacitor Cp and the storage capacitor Cst are coupled to a common electrode. However, in other embodiments, each of the pixels may also include more than two switch elements SW, more than two storage capacitors Cst, or more than two pixel capacitors Cp. In addition, the switch element SW, the storage capacitor Cst and the pixel capacitor Cp may also have other coupling relations. The invention is not limited by amounts and coupling relations of the switch element, the storage capacitor and the pixel capacitor. Please note that in the layer structure of the display panel 110, the common electrodes of the storage capacitors Cst, or the common electrodes of the pixel capacitors Cp, may be disposed at one or more layers. Locations of the common electrodes have numerous variations regarding to types of driving methods for driving liquid crystal, such as twisted nematic (TN), vertical alignment (VA), in-plane switching (IPS), fringe field switching (FFS), etc., however, the invention is not limited by the liquid crystal driving methods.

When the switch element SW is turned on, the data driver 130 outputs a driving voltage Vc to the pixel capacitor Cp and the storage capacitor Cst. When the switch element SW is turned off, the driving voltage Vc is maintained in the pixel 111, and a voltage difference between two electrodes of the pixel capacitor Cp is formed by the driving voltage Vc and a common voltage Vcom. A display medium (e.g., a liquid crystal) is disposed between the two electrodes of the pixel capacitor Cp, and the voltage difference between the two electrodes of the pixel capacitor Cp changes a rotating angle of the liquid crystal. In particular, a plurality of common electrodes are disposed in the display panel 110, and different pixels may be coupled to different common electrodes. For instance, the pixel 111 is coupled to a first common electrode, and a pixel 112 is coupled to a second common electrode. Therein, the first common electrode and the second common electrode are electrically independent from each other. In other words, a potential on the first common electrode is different from a potential on the second common electrode. In an exemplary embodiment, the potentials on the first common electrode and the second common electrode can be used to control a phenomenon of polarity inversion. However, in the invention, magnitudes of the potentials on the first common electrode and second common electrode are not limited, and what sort of operations the potentials are used for is not limited either.

FIG. 2 through FIG. 34 are schematic diagrams illustrating a plurality of common electrodes according to exemplary embodiments.

Figure 2:
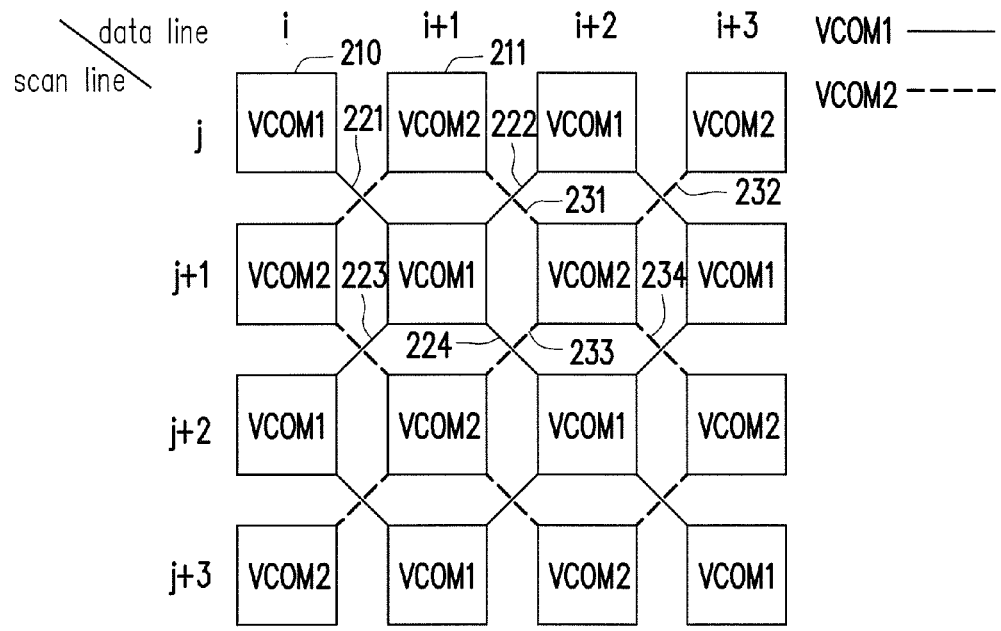
FIG. 2 through FIG. 34 are schematic diagrams illustrating a plurality of common electrodes according to exemplary embodiments.

Referring FIG. 2, for a simpler view, only the pixels and a plurality of wires by which the common electrodes are coupled are illustrated in the exemplary embodiment of FIG. 2, and VCOM1/VCOM2 denote the corresponding common electrode of each pixel, so as to describe the coupling relation between the pixels and the common electrodes. Herein, a position of one pixel is indicated by the data line and the scan line. For instance, a pixel 210 is located on a $i^{th}$ data line and a $j^{th}$ scan line. Therein, i and j are positive integers, but values of the positive integers i and j are not particularly limited in the invention. On the other hand, "VCOM1" marked in one pixel indicates that the corresponding pixel is coupled to the first common electrode, whereas "VCOM2" indicates that the corresponding pixel is coupled to the second common electrode. For instance, the pixel 210 is coupled to the first common electrode, and a pixel 211 is coupled to the second common electrode. In addition, in FIG. 2, full lines are used to indicate the wires by which the first common electrodes are coupled, and dashed lines are used to indicate the wires by which the second common electrode are coupled.

In the exemplary embodiment of FIG. 2, the pixels are coupled to the first common electrodes and the second common electrodes disposed in form of a chessboard. More specifically, the pixel 210 located on the $i^{th}$ data line and the $j^{th}$ scan line, called p(i, j) hereinafter, is coupled to the first common electrode, and the first common electrode of the pixel p(i, j) is coupled to the first common electrode of the pixel located on a $(i+1)^{th}$ data line and a $(j+1)^{th}$ scan line, called p(i+1, j+1) hereinafter, through a wire 221. The first common electrode of the pixel p(i+1, j+1) is coupled to the first common electrode of the pixel p(i+2, j) located on a $(i+2)^{th}$ data line and the $j^{th}$ scan line through a wire 222. The first common electrode of the pixel p(i+1, j+1) is coupled to the first common electrode of the pixel p(i, j+2) located on the $i^{th}$ data line and a $(j+2)^{th}$ scan line through a wire 223. The first common electrode of the pixel p(i+1, j+1) located on the $(i+1)^{th}$ data line and the $(j+1)^{th}$ scan line is coupled to the first common electrode of the pixel p(i+2, j+2) located on the $(i+2)^{th}$ data line and the $(j+2)^{th}$ scan line through a wire 224. In addition, the pixel 211 as p(i+1, j) located on the $(i+1)^{th}$ data line and the $j^{th}$ scan line is coupled to the second common electrode, and the second common electrode of the pixel 211, p(i+1, j), is coupled to the second common electrode of the pixel p(i+2, j+1) located on the $(i+2)^{th}$ data line and the $(j+1)^{th}$ scan line through a wire 231. The second common electrode of the pixel p(i+2, j+1) is coupled to the second common electrode of the pixel p(i+3, j) located on a $(i+3)^{th}$ data line and the $j^{th}$ scan line through a wire 232. The second common electrode of the pixel p(i+2, j+1) is coupled to the second common electrode of the pixel p(i+1, j+2) located on the $(i+1)^{th}$ data line and the $(j+2)^{th}$ scan line through a wire 233. The second common electrode of the pixel p(i+2, j+1) is coupled to the second common electrode of the pixel p(i+3, j+2) located on the $(i+3)^{th}$ data line and the $(j+2)^{th}$ scan line through a wire 234.

It should be noted that in FIG. 2, the wire 222 and the wire 231 are crossed over each other. In an exemplary embodiment, the wire 222 and the wire 231 are disposed on different layers in a die, and each of the layers are corresponded to one mask process. For instance, the wire 222 is disposed on a first metal layer, and the wire 231 is disposed on a second metal layer. However, in FIG. 2 of the invention, the wires are not limited to be disposed on which layer, and a material of the wires is not limited either. For instance, the material of the wires may be an aluminum, a copper, an indium tin oxide (ITO), a transparent conductive film, or any conducting materials. In all of exemplary embodiments in FIG. 3 through FIG. 34, the wires are not limited to be disposed to which layer, and the material of the wires is not limited either, and related descriptions thereto are not repeated hereinafter.

Figure 3:
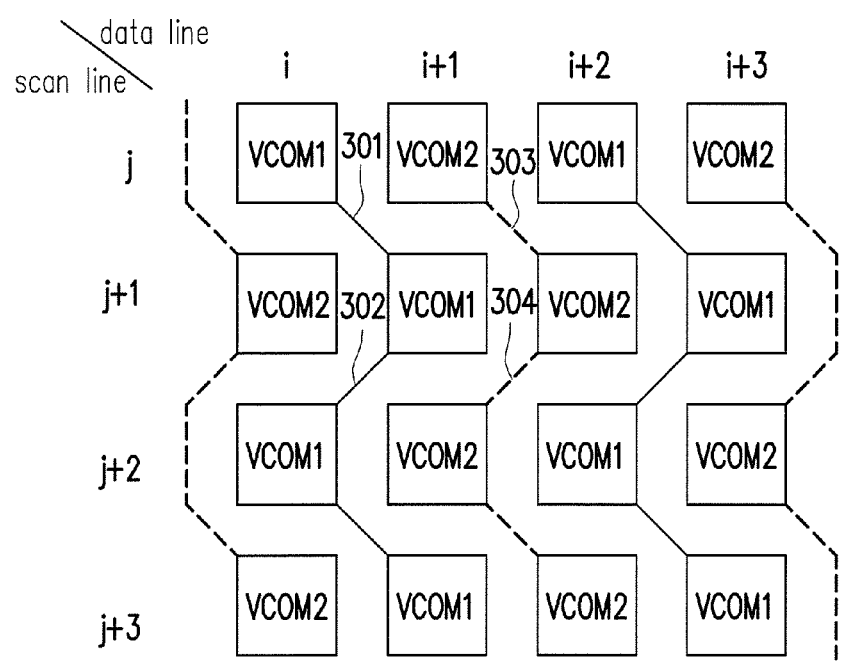

Referring to FIG. 3, in the exemplary embodiment of FIG. 3, the pixels are coupled to the first common electrodes or the second common electrodes in form of a serration along longitudinal direction. More specifically, the pixel p(i, j) located on the $i^{th}$ data line and the $j^{th}$ scan line is coupled to the first common electrode, and the first common electrode of the pixel p(i, j) is coupled to the first common electrode of the pixel p(i+1, j+1) located on the $(i+1)^{th}$ data line and the $(j+1)^{th}$ scan line through a wire 301. The first common electrode of the pixel p(i+1, j+1) is coupled to the first common electrode of the pixel p(i, j+2) located on the $i^{th}$ data line and the $(j+2)^{th}$ scan line through a wire 302. The pixel p(i+1, j) located on the $(i+1)^{th}$ data line and the $j^{th}$ scan line is coupled to the second common electrode, and the second common electrode of the pixel p(i+1, j) is coupled to the second common electrode of the pixel p(i+2, j+1) located on the $(i+2)^{th}$ data line and the $(j+1)^{th}$ scan line through a wire 303. The second common electrode of the pixel p(i+2, j+1) is coupled to the second common electrode of the pixel p(i+1, j+2) located on the $(i+1)^{th}$ data line and the $(j+2)^{th}$ scan line through a wire 304. The rest of the coupling relations are as illustrated in the figure, thus related description is omitted hereinafter.

Figure 4:
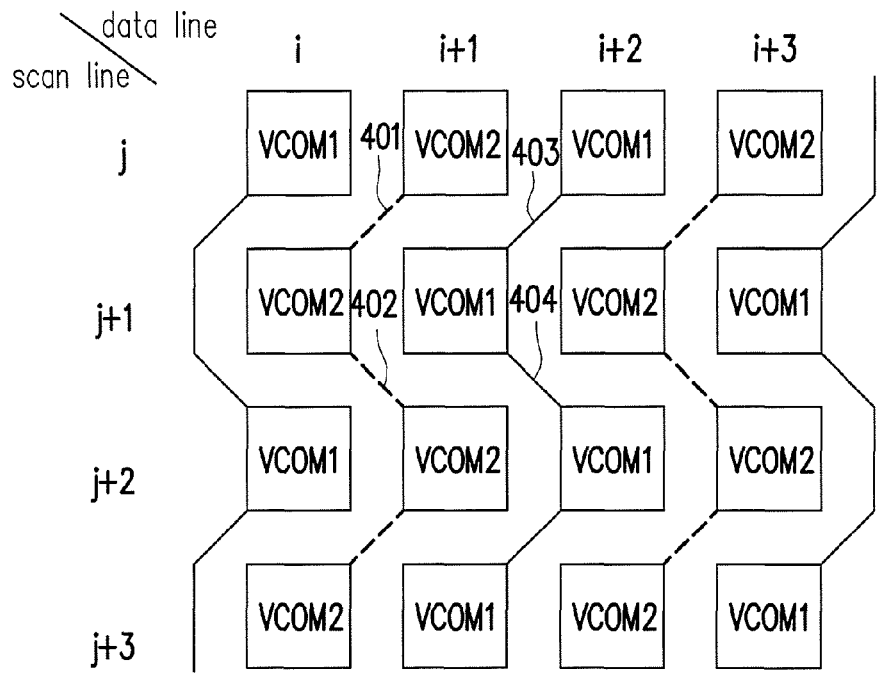

Referring to FIG. 4, in the exemplary embodiment of FIG. 4, the pixels are also coupled to the first common electrodes or the second common electrodes in form of the serration along longitudinal direction. More specifically, the pixel p(i+1, j) located on the $(i+1)^{th}$ data line and the $j^{th}$ scan line is coupled to the second common electrode, and the second common electrode of the pixel p(i+1, j) is coupled to the second common electrode of the pixel p(i, j+1) located on a $i^{th}$ data line and a $(j+1)^{th}$ scan line through a wire 401. The second common electrode of the pixel p(i, j+1) located on the $i^{th}$ data line and the $(j+1)^{th}$ scan line is coupled to the second common electrode of the pixel p(i+1, j+2) located on the $(i+1)^{th}$ data line and the $(j+2)^{th}$ scan line through a wire 402. The pixel p(i+2, j) located on the $(i+2)^{th}$ data line and the $j^{th}$ scan line is coupled to the first common electrode, and the first common electrode of the pixel p(i+1, j+1) is coupled to the pixel located on the $(i+1)^{th}$ data line and the $(j+1)^{th}$ scan line through a wire 403. The first common electrode of the pixel p(i+1, j+1) is coupled to the first common electrode of the pixel p(i+2, j+2) located on the $(i+2)^{th}$ data line and the (j+2)th scan line through a wire 404. The rest of the coupling relations are as illustrated in the figure, thus related description is omitted hereinafter.

Figure 5:
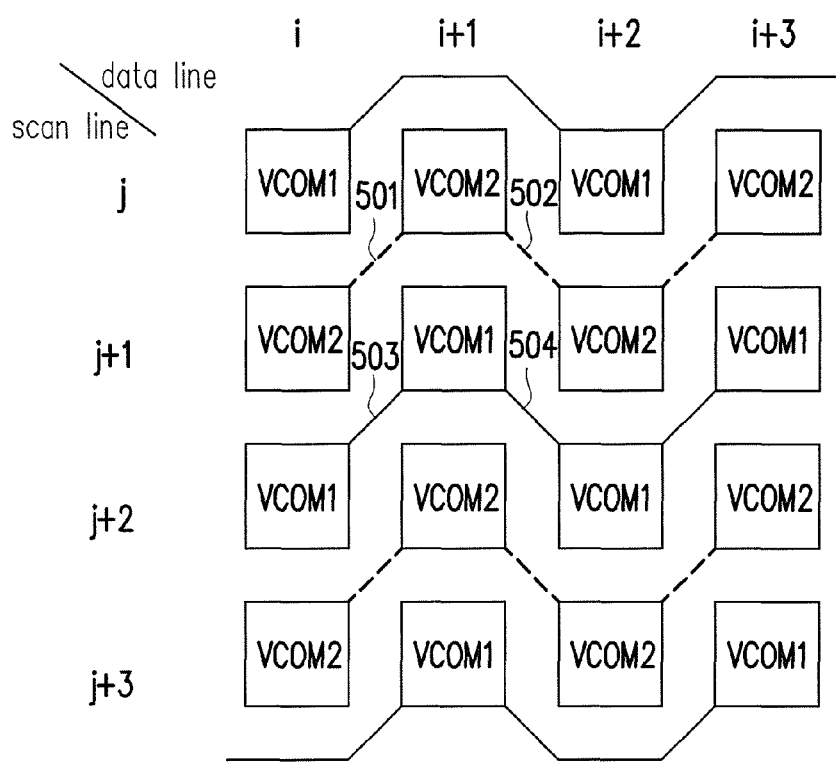

Referring to FIG. 5, in the exemplary embodiment of FIG. 5, the pixels are coupled to the first common electrodes or the second common electrodes in form of a serration along transverse direction. More specifically, the pixel p(i, j+1) located on the $i^{th}$ data line and the $(j+1)^{th}$ scan line is coupled to the second common electrode, and the second common electrode of the pixel p(i, j+1) is coupled to the second common electrode of the pixel p(i+1, j) located on the $(i+1)^{th}$ data line and the $j^{th}$ scan line through a wire 501. The second common electrode of the pixel p(i+1, j) is coupled to the second common electrode of the pixel p(i+2, j+1) located on the $(i+2)^{th}$ data line and the $(j+1)^{th}$ scan line through a wire 502. The pixel p(i, j+2) located on the $i^{th}$ data line and the $(j+2)^{th}$ scan line is coupled to the first common electrode, and the first common electrode of the pixel p(i, j+2) is coupled to the first common electrode of the pixel p(i+1, j+1) located on the $(i+1)^{th}$ data line and the $(j+1)^{th}$ scan line through a wire 503. The first common electrode of the pixel p(i+1, j+1) is coupled to the first common electrode of the pixel p(i, j+2) located on the $(i+2)^{th}$ data line and the $(j+2)^{th}$ scan line through a wire 504. The rest of the coupling relations are as illustrated in the figure, thus related description is omitted hereinafter.

Figure 6:
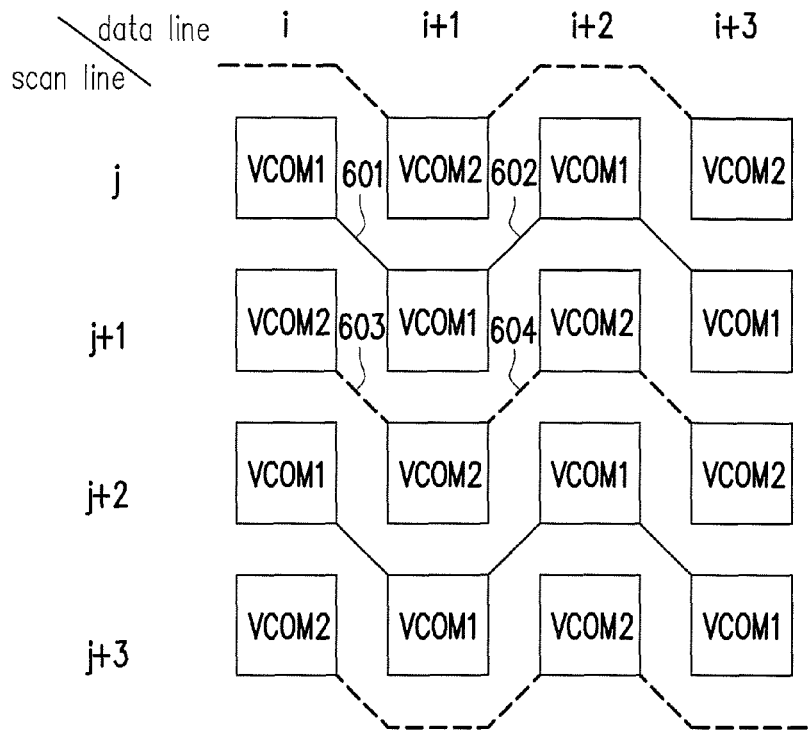

Referring to FIG. 6, in the exemplary embodiment of FIG. 6, the pixels are also coupled to the first common electrodes or the second common electrodes in form of the serration along transverse direction. More specifically, the pixel p(i, j) located on the $i^{th}$ data line and the $j^{th}$ scan line is coupled to the first common electrode, and the first common electrode of the pixel p(i, j) is coupled to the first common electrode of the pixel p(i+1, j+1) located on the $(i+1)^{th}$ data line and the $(j+1)^{th}$ scan line through a wire 601. The first common electrode of the pixel p(i+1, j+1) is coupled to the first common electrode of the pixel p(i+2, j) located on the $(i+2)^{th}$ data line and the $j^{th}$ scan line through a wire 602. The pixel p(i, j+1) located on the $i^{th}$ data line and the $(j+1)^{th}$ scan line is coupled to the second common electrode, and the second common electrode of the pixel p(i, j+1) is coupled to the second common electrode of the pixel p(i+1, j+2) located on the $(i+1)^{th}$ data line and the $(j+2)^{th}$ scan line through a wire 603. The second common electrode of the pixel p(i+1, j+2) is coupled to the second common electrode of the pixel p(i+2, j+1) located on the $(i+2)^{th}$ data line and the $(j+1)^{th}$ scan line through a wire 604. The rest of the coupling relations are as illustrated in the figure, thus related description is omitted hereinafter.

Figure 7:
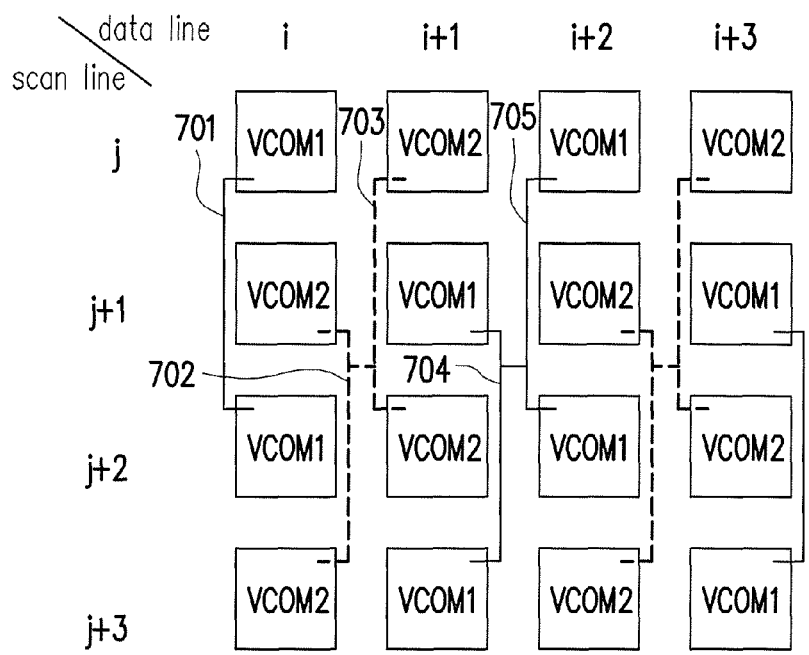

Referring to FIG. 7, in the exemplary embodiment of FIG. 7, the pixel p(i, j) located on the $i^{th}$ data line and the $j^{th}$ scan line is coupled to the first common electrode, and the first common electrode of the pixel p(i, j) is coupled to the first common electrode of the pixel p(i, j+2) located on the $i^{th}$ data line and the $(j+2)^{th}$ scan line through a wire 701. The pixel p(i, j+1) located on the $i^{th}$ data line and the $(j+1)^{th}$ scan line is coupled to the second common electrode, and the second common electrode of the pixel p(i, j+1) is coupled to the second common electrode of the pixel p(i, j+3) located on the $i^{th}$ data line and a $(j+3)^{th}$ scan line through a wire 702. The second common electrode of the pixel p(i+1, j) located on the $(i+1)^{th}$ data line and the $i^{th}$ scan line is coupled to the second common electrode of the pixel p(i+1, j+2) located on the $(i+1)^{th}$ data line and the $(j+2)^{th}$ scan line through a wire 703. The first common electrode of the pixel p(i+1, j+1) is coupled to the first common electrode of the pixel p(i, j+3) located on the $(i+1)^{th}$ data line and the $(j+3)^{th}$ scan line through a wire 704. The wires 702 and 703 are neighboring and are coupled by a wire. Furthermore, the first common electrode of the pixel p(i+2, j) is coupled to the first common electrode of the pixel p(i+2, j+2) located on the $(i+2)^{th}$ data line and the $(j+2)^{th}$ scan line through a wire 705, and the wires 704 and 705 are neighboring and are coupled. The rest of the coupling relations are as illustrated in the figure, thus related description is omitted hereinafter.

Figure 8:
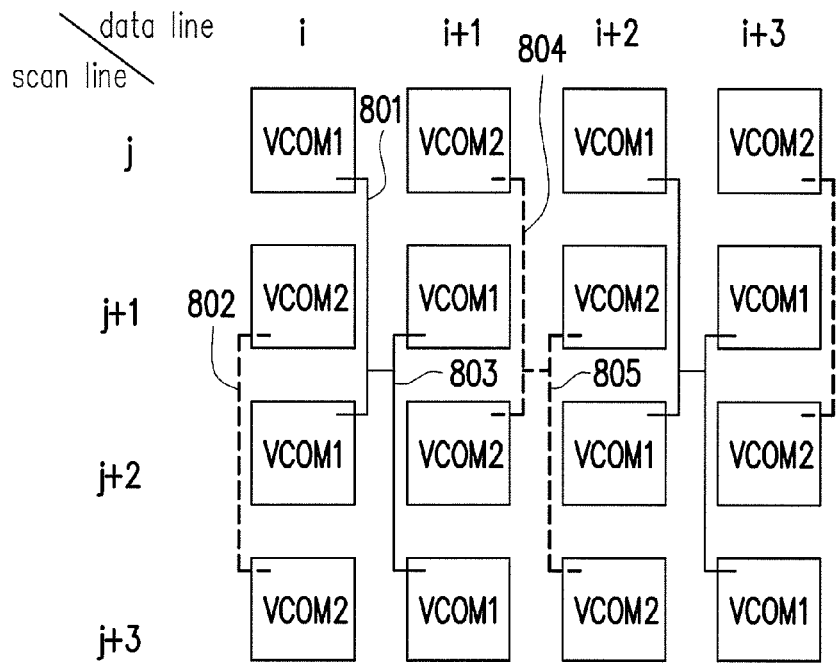

Referring to FIG. 8, in the exemplary embodiment of FIG. 8, the pixel p(i, j) located on the $i^{th}$ data line and the $j^{th}$ scan line is coupled to the first common electrode, and the first common electrode of the pixel p(i, j) is coupled to the first common electrode of the pixel p(i, j+2) located on the $i^{th}$ data line and the $(j+2)^{th}$ scan line through a wire 801. The pixel p(i, j+1) located on the $i^{th}$ data line and the $(j+1)^{th}$ scan line is coupled to the second common electrode, and the second common electrode of the pixel p(i, j+1) is coupled to the second common electrode of the pixel p(i, j+3) located on the $i^{th}$ data line and the $(j+3)^{th}$ scan line through a wire 802. The first common electrode of the pixel p(i+1, j+1) located on the $(i+1)^{th}$ data line and the $(j+1)^{th}$ scan line is coupled to the first common electrode of the pixel p(i+1, j+3) located on the $(i+1)^{th}$ data line and the $+3)^{th}$ scan line through a wire 803. The wires 801 and 803 are neighboring and are coupled by a wire. The second common electrode of the pixel p(i+1, j) located on the $(i+1)^{th}$ data line and the $j^{th}$ scan line is coupled to the second common electrode of the pixel p(i+1, j+2) located on the $(i+1)^{th}$ data line and the $(j+2)^{th}$ scan line through a wire 804. The second common electrode of the pixel p(i+2, j+1) located on the $(i+2)^{th}$ data line and the $(j+1)^{th}$ scan line is coupled to the second common electrode of the pixel p(i+2, j+3) located on the $(i+2)^{th}$ data line and the $(j+3)^{th}$ scan line through a wire 805. The wires 804 and 805 are neighboring and are coupled by a wire. The rest of the coupling relations are as illustrated in the figure, thus related description is omitted hereinafter.

Figure 9:
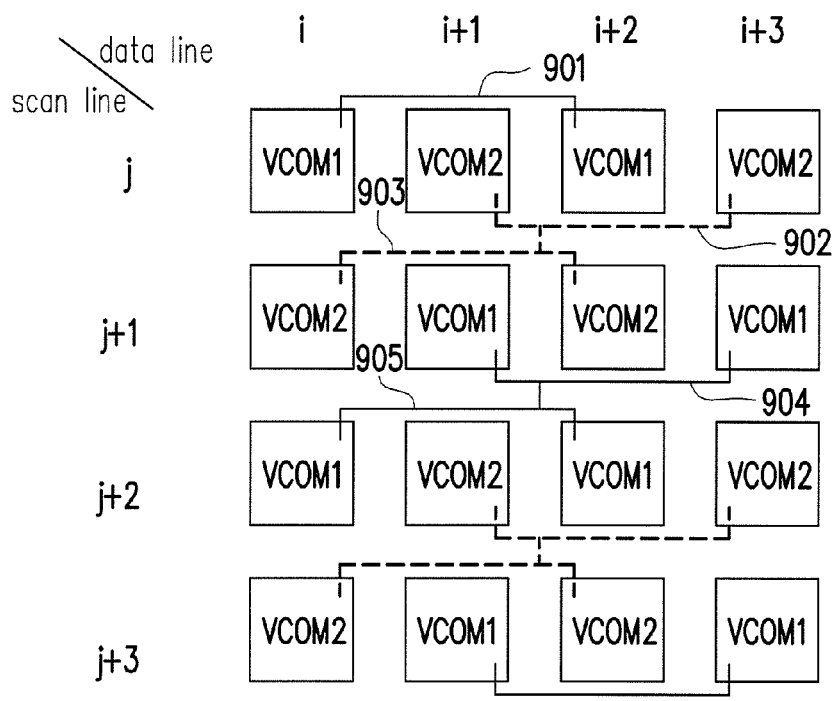

Referring to FIG. 9, in the exemplary embodiment of FIG. 9, the pixel p(i, j) located on the $i^{th}$ data line and the $j^{th}$ scan line is coupled to the first common electrode, and the first common electrode of the pixel p(i, j) is coupled to the first common electrode of the pixel p(i+2, j) located on the $(i+2)^{th}$ data line and the $j^{th}$ scan line through a wire 901. The pixel p(i+1, j) located on the $(i+1)^{th}$ data line and the $j^{th}$ scan line is coupled to the second common electrode, and the second common electrode of the pixel p(i+1, j) is coupled to the second common electrode of the pixel p(i+3, j) located on the $(i+3)^{th}$ data line and the $j^{th}$ scan line through a wire 902. The second common electrode of the pixel p(i, j+1) located on the $i^{th}$ data line and the $(j+1)^{th}$ scan line is coupled to the second common electrode of the pixel p(i+2, j+1) located on the $(i+2)^{th}$ data line and the $(j+1)^{th}$ scan line through a wire 903. The wires 902 and 903 are neighboring and are coupled by a wire. The first common electrode of the pixel p(i+1, j+1) located on the $(i+1)^{th}$ data line and the $(j+1)^{th}$ scan line is coupled to the first common electrode of the pixel p(i+3, j+1) located on the $(i+3)^{th}$ data line and the $(j+1)^{th}$ scan line through a wire 904. The first common electrode of the pixel p(i, j+2) located on the $i^{th}$ data line and the $(j+2)^{th}$ scan line is coupled to the first common electrode of the pixel p(i+2, j+2) located on the $(i+2)^{th}$ data line and the $(j+2)^{th}$ scan line through a wire 905. The wires 904 and 905 are neighboring and are coupled by a wire. The rest of the coupling relations are as illustrated in the figure, thus related description is omitted hereinafter.

Figure 10:
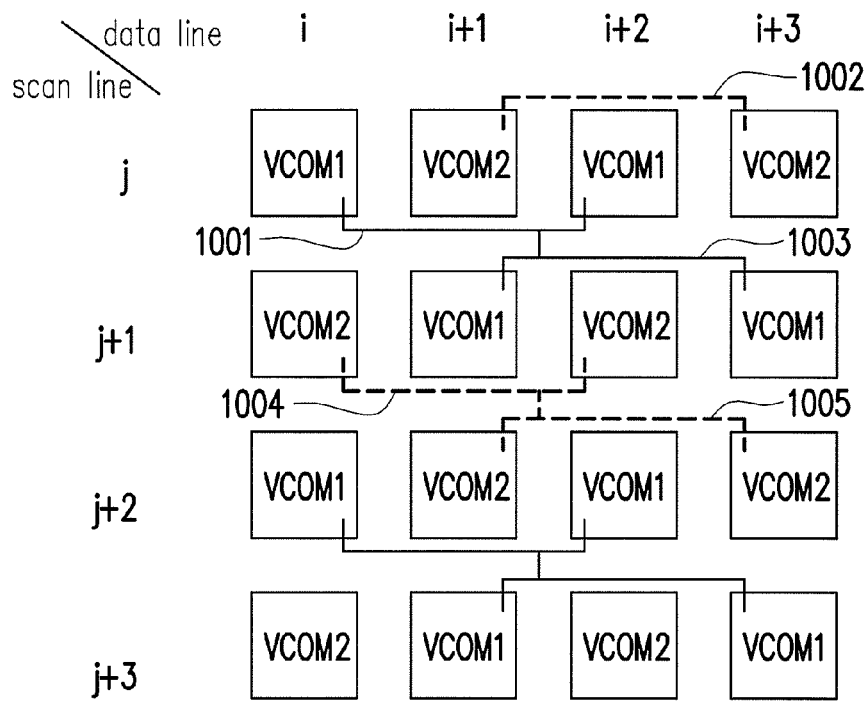

Referring to FIG. 10, in the exemplary embodiment of FIG. 10, the pixel p(i, j) located on the $i^{th}$ data line and the $j^{th}$ scan line is coupled to the first common electrode, and the first common electrode of the pixel p(i, j) is coupled to the first common electrode of the pixel p(i+2, j) located on the $(i+2)^{th}$ data line and the $j^{th}$ scan line through a wire 1001. The pixel p(i+1, j) located on the $(i+1)^{th}$ data line and the $j^{th}$ scan line is coupled to the second common electrode, and the second common electrode of the pixel p(i+1, j) is coupled to the second common electrode of the pixel p(i+3, j) located on the $(i+3)^{th}$ data line and the $j^{th}$ scan line through a wire 1002. The first common electrode of the pixel p(i+1, j+1) located on the $(i+1)^{th}$ data line and the $(j+1)^{th}$ scan line is coupled to the first common electrode of the pixel p(i+3, j+1) located on the $(i+3)^{th}$ data line and the $(j+1)^{th}$ scan line through a wire 1003. The wires 1001 and 1003 are neighboring and are coupled by a wire. The second common electrode of the pixel p(i, j+1) located on the $i^{th}$ data line and the $(j+1)^{th}$ scan line is coupled to the second common electrode of the pixel p(i+2, j+1) located on the $(i+2)^{th}$ data line and the $(j+1)^{th}$ scan line through a wire 1004. The second common electrode of the pixel p(i+1, j+2) located on the $(i+1)^{th}$ data line and the $(j+2)^{th}$ scan line is coupled to the second common electrode of the pixel p(i+3, j+2) located on the $(i+3)^{th}$ data line and the $(j+2)^{th}$ scan line through a wire 1005. The wires 1004 and 1005 are neighboring and are coupled by a wire. The rest of the coupling relations are as illustrated in the figure, thus related description is omitted hereinafter.

Figure 11:
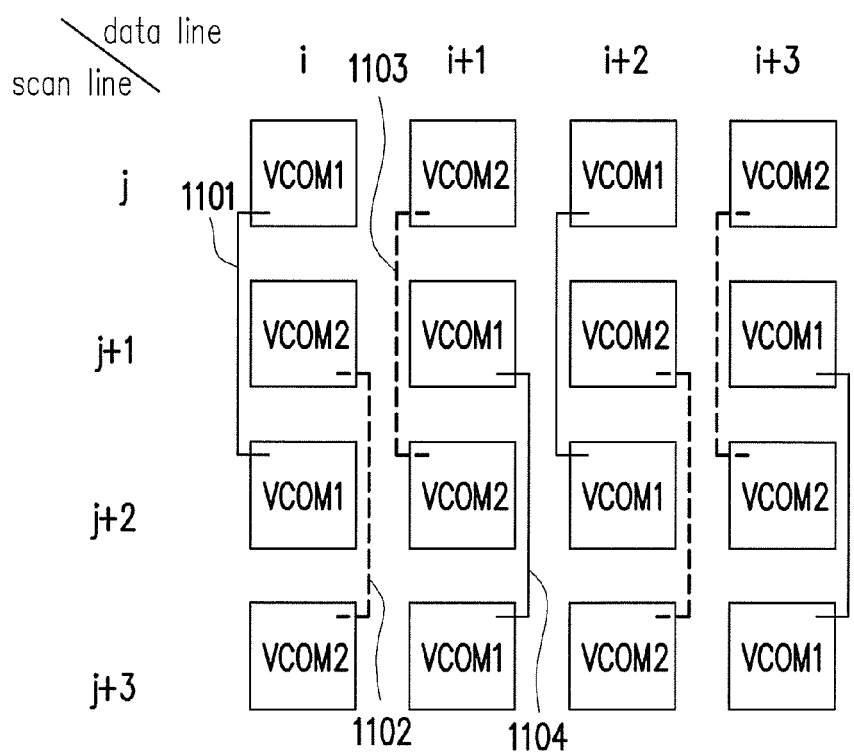

Referring to FIG. 11, The wire pattern in FIG. 11 is similar to that in FIG. 7 and the difference is that the adjacent wires 1102 and 1103 are not coupled.

Figure 12:
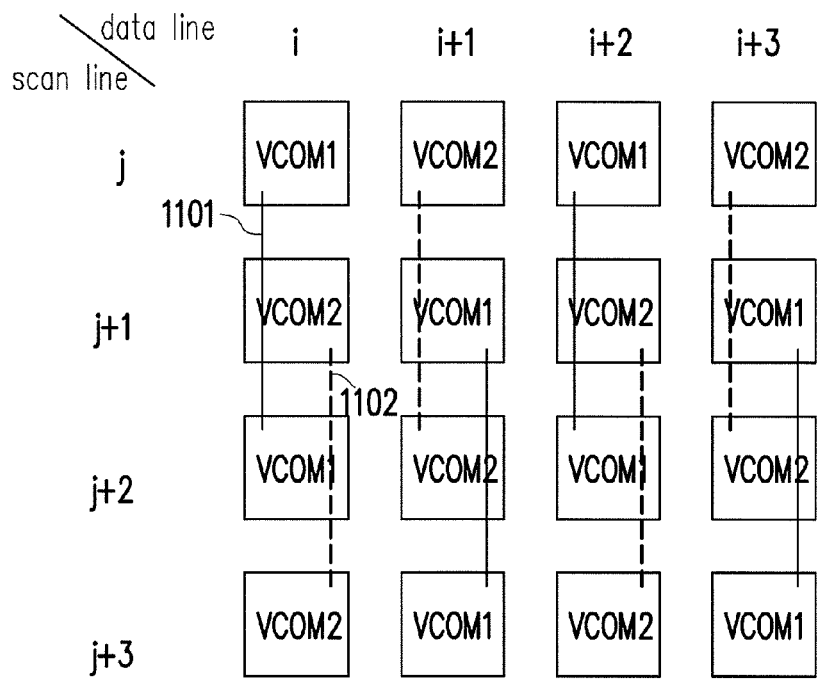

Referring to FIG. 12. FIG. 12 is similar to FIG. 11, and the difference is that the wire 1201 connecting the first common electrodes crosses over the second common electrode of the pixel p(i, j+1) located on the $i^{th}$ data line and the $(j+1)^{th}$ scan line, and the wire 1202 connecting the second common electrodes crosses over the first common electrode of the pixel p(i, j+2) located on the $i^{th}$ data line and the $(j+2)^{th}$ scan line. Please note that a wire crossing over a common electrode means that the wire is disposed at a layer which is above or below a layer of the common electrode, so that the wire looks like crossing the common electrode in a top-down (or bottom-up) perspective.

Figure 13:
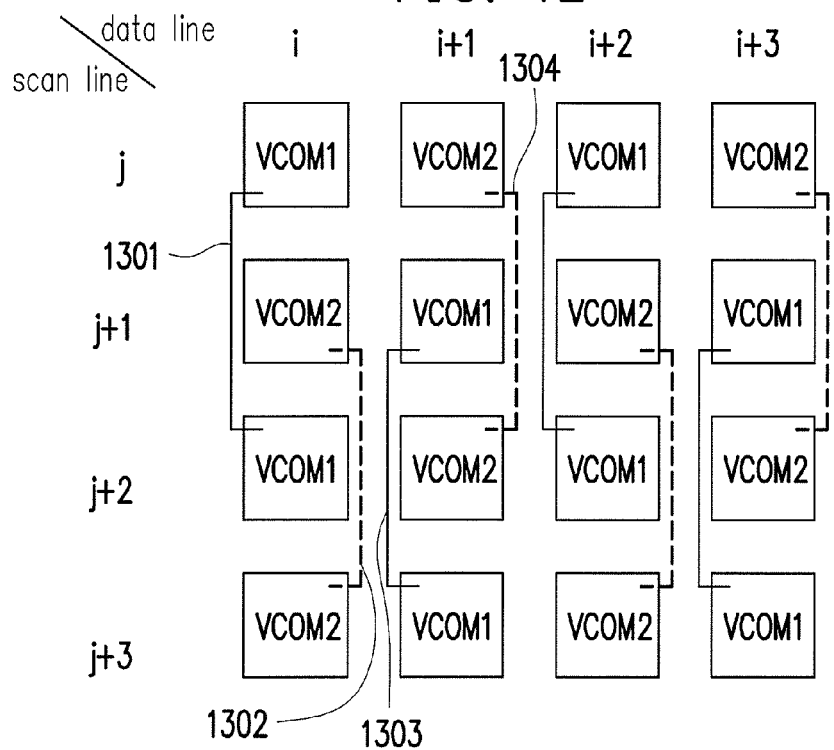

Referring to FIG. 13, in the exemplary embodiment of FIG. 13, the first common electrode of the pixel p(i, j) located on the $i^{th}$ data line and the $j^{th}$ scan line is coupled to the first common electrode of the pixel p(i, j+2) located on the $i^{th}$ data line and the $(j+2)^{th}$ scan line through a wire 1301. The second common electrode of the pixel p(i, j+1) located on the $i^{th}$ data line and the $(j+1)^{th}$ scan line is coupled to the $(j+3)^{th}$ second common electrode of the pixel p(i, j+3) located on the $i^{th}$ data line and a scan line through a wire 1302. The second common electrode of the pixel p(i+1, j) located on the $(i+1)^{th}$ data line and the $j^{th}$ scan line is coupled to the second common electrode of the pixel p(i+1, j+2) located on the $(i+1)^{th}$ data line and the $(j+2)^{th}$ scan line through a wire 1303. The first common electrode of the pixel p(i+1, j+1) is coupled to the first common electrode of the pixel p(i, j+3) located on the $(i+1)^{th}$ data line and the $(j+3)^{th}$ scan line through a wire 1304. The wire 1302 for connecting the second common electrodes and the wire 1303 for connecting the first common electrodes are neighboring. The rest of the coupling relations are as illustrated in the figure, thus related description is omitted hereinafter.

Figure 14:
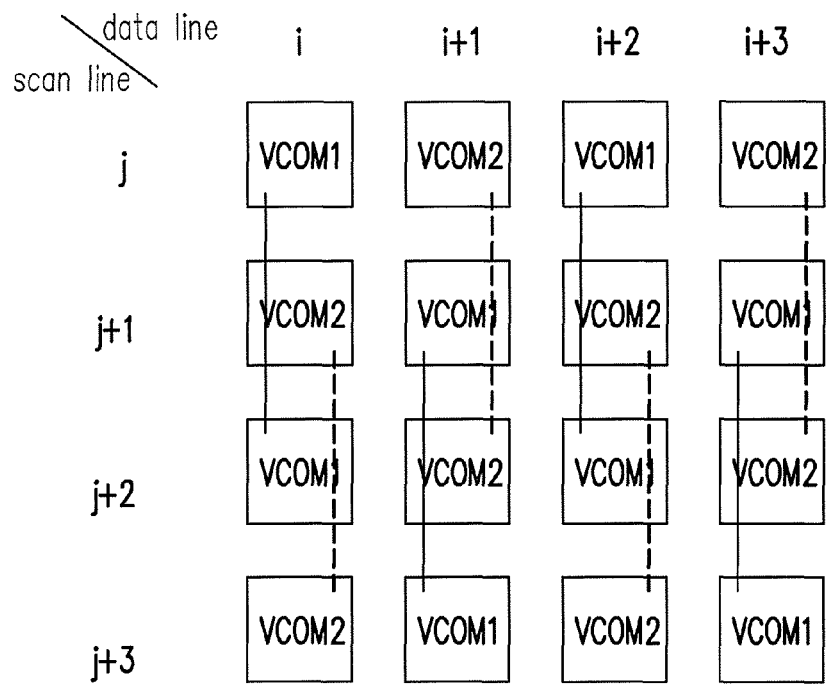
Figure 15:
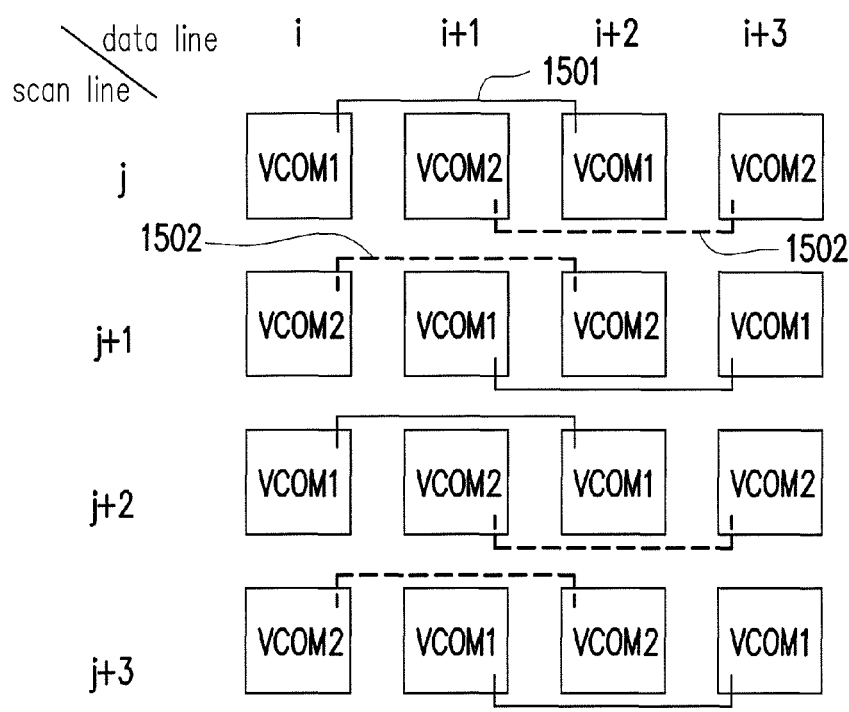
Figure 16:
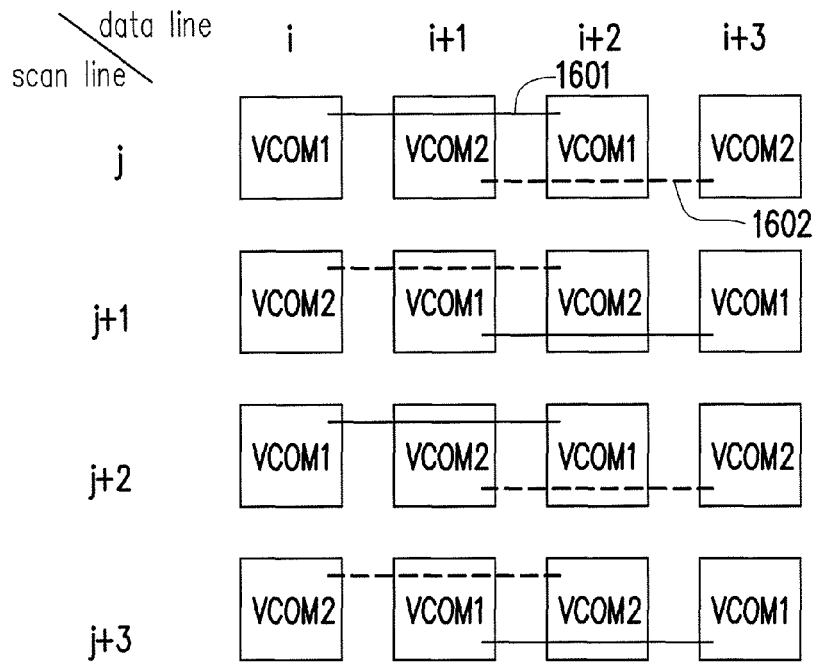

FIG. 14 is similar to FIG. 13, and the difference is that the wire 1401 connecting the first common electrodes crosses over the second common electrode of the pixel p(i, j+1) located on the $i^{th}$ data line and the $(j+1)^{th}$ scan line, and the wire 1402 connecting the second common electrodes crosses over the first common electrode of the pixel p(i, j+2) located on the $i^{th}$ data line and the $(j+2)^{th}$ scan line. Please note that a wire crossing over a common electrode means that the wire is disposed at a layer which is above or below a layer of the common electrode, so that the wire looks like crossing the common electrode in a top-down (or bottom-up) perspective. Referring to FIG. 15, in the exemplary embodiment of FIG. 15, the pixel p(i, j) located on the $i^{th}$ data line and the $j^{th}$ scan line is coupled to the first common electrode, and the first common electrode of the pixel p(i, j) is coupled to the first common electrode of the pixel p(i+2, j) located on the $(i+2)^{th}$ data line and the $j^{th}$ scan line through a wire 1501. The pixel p(i+1, j) located on the $(i+1)^{th}$ data line and the $j^{th}$ scan line is coupled to the second common electrode, and the second common electrode of the pixel p(i+1, j) is coupled to the second common electrode of the pixel p(i+3, j) located on the (i+3)$^{th}$ data line and the j$^{th}$ scan line through a wire 1502. Referring to FIG. 16, FIG. 16 is similar to FIG. 15 and the difference is that a wire 1601 connecting the first common electrodes crosses over the second common electrode of the pixel p(i+1, j) located on the (i+1)$^{th}$ data line and the j$^{th}$ scan line, and a wire 1602 connecting the second common electrodes crosses over the first common electrode of the pixel p(i+2, j) located on the (i+2)$^{th}$ data line and the j$^{th}$ scan line. In an exemplary embodiment, the wires 1601 and 1602 are disposed on the same metal layer where the scan lines are located, but the invention is not limited thereto. In the present embodiment, the wires 1602 are neighboring as illustrated in FIG. 15.

Figure 17:
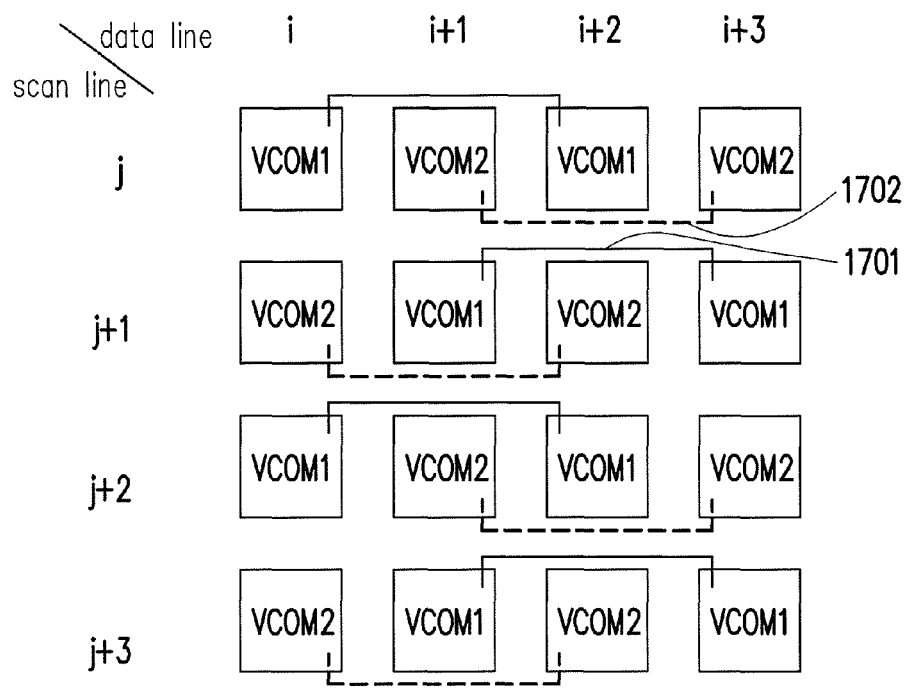
Figure 18:
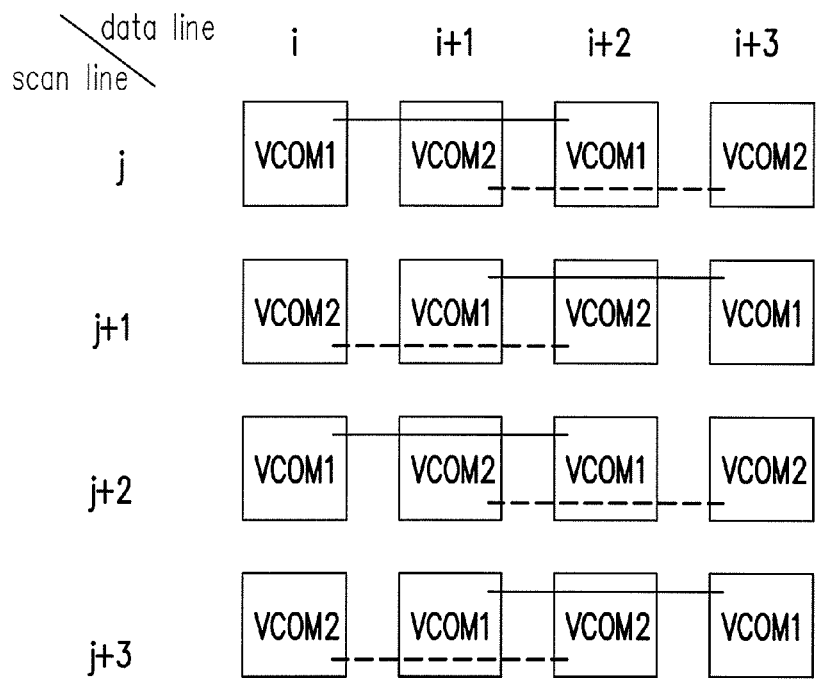

Referring to FIG. 17 and FIG. 18, FIG. 17 is similar to FIG. 15, FIG. 18 is similar to FIG. 16, and only positions of the wires are disposed slightly different from each other in said figures. In the exemplary embodiment of FIG. 17, the wires 1701 and 1702 are neighboring as illustrated in FIG. 17.

The wires connecting the first or second common electrodes such as 701-705, 801-805 and so on shown in FIG. 7 to FIG. 18 may be disposed in different locations in a layer structure of a display panel. In an exemplary embodiment, the wires connecting the first or second common electrodes in the vertical direction, as shown in FIGS. 7-8 and 11-14, are disposed on a layer where the data lines are disposed. In another exemplary embodiment, the wires connecting the first or second common electrodes in the horizontal direction, as shown in FIGS. 9-10 and 15-18, are disposed on a layer where the scan lines are disposed. In another exemplary embodiment, the wires shown in FIGS. 7-18 may be disposed on a layer different from the layers of the data lines and the scan lines. In another aspect, the wires connecting the first or second common electrodes may be disposed on the same layer or different layers where the common electrodes are disposed. For example, the wires shown in the exemplary embodiments FIGS. 7-11, 13, 15, 17 may be disposed on the same layer or different layers where the common electrodes are disposed, and if on the same layer, the wires are disposed on a region excluding the first common electrodes and second common electrodes. The wires shown in the exemplary embodiments FIGS. 12, 14, 16, 18 may be disposed on one or more layers different from where the common electrodes are disposed.

Figure 19:
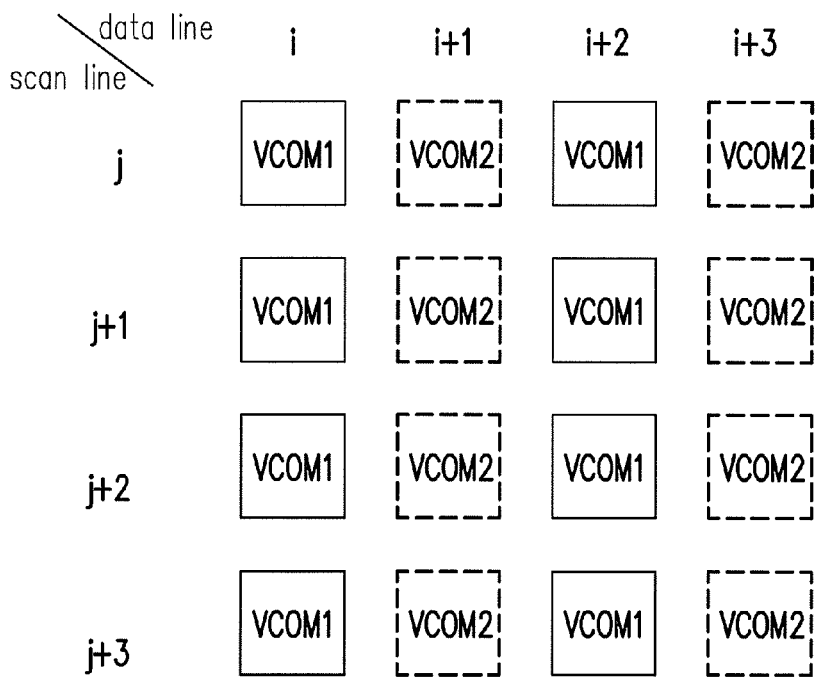

Referring to FIG. 19, in the exemplary embodiment of FIG. 19, the pixels located on the same data line are all coupled to the first common electrodes or the second common electrodes. For instance, the pixels located on the i$^{th}$ data line are all coupled to the first common electrodes, and the pixel located on the (i+1)$^{th}$ data line are all coupled to the second common electrodes. However, disposition of the wires depicted in FIG. 19 is not particularly limited in the invention.

Figure 20:
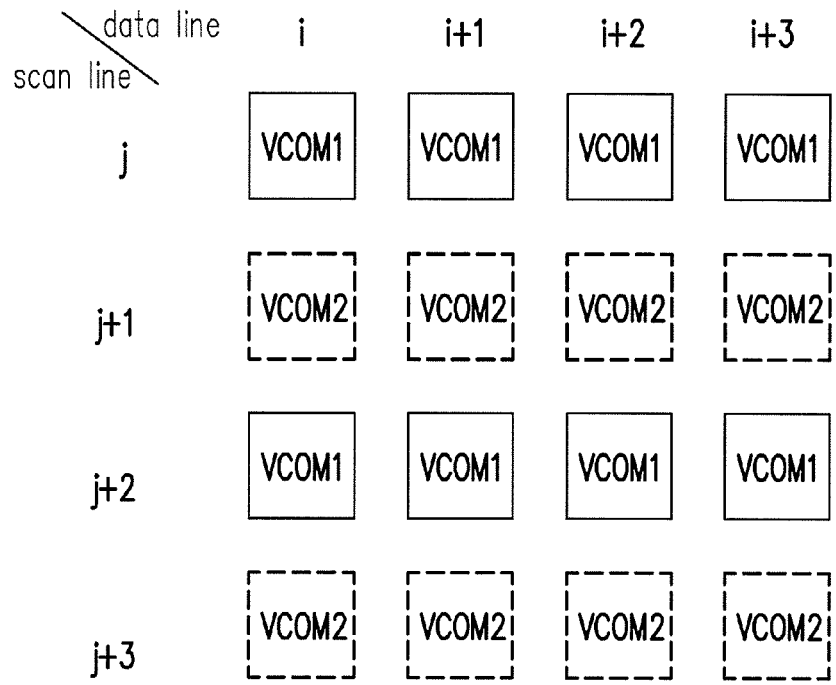

Referring to FIG. 20, in the exemplary embodiment of FIG. 20, the pixels located on the same scan line are all coupled to the first common electrodes or the second common electrodes. For instance, the pixels located on the j$^{th}$ scan line are all coupled to the first common electrodes, and the pixel located on the (j+1)$^{th}$ scan line are all coupled to the second common electrodes. However, disposition of the wires depicted in FIG. 20 is not particularly limited in the invention.

Figure 21:
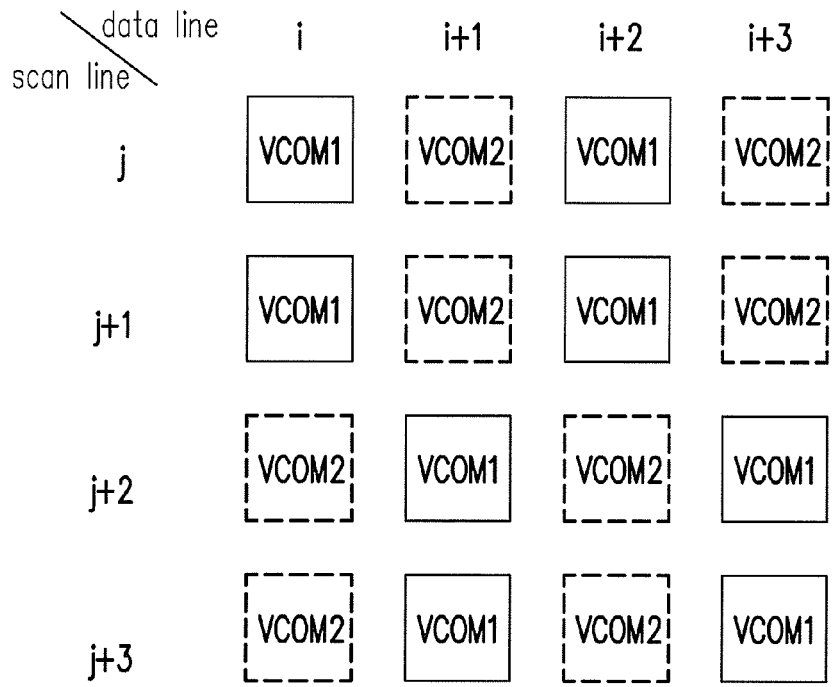

Referring to FIG. 21, in the exemplary embodiment of FIG. 21, each two adjacent pixels on the data line are coupled to the same common electrodes. For instance, the pixel p(i, j) located on the i$^{th}$ data line and the j$^{th}$ scan line and the pixel located p(i, j+1) on the i$^{th}$ data line and the (j+1)$^{th}$ scan line are coupled to the first common electrodes. The pixel p(i+1, j) located on the (i+1)$^{th}$ data line and the i$^{th}$ scan line and the pixel p(i+1, j+1) located on the (i+1)$^{th}$ data line and the (j+1)$^{th}$ scan line are coupled to the second common electrodes. However, disposition of the wires depicted in FIG. 21 is not particularly limited in the invention.

Figure 22:
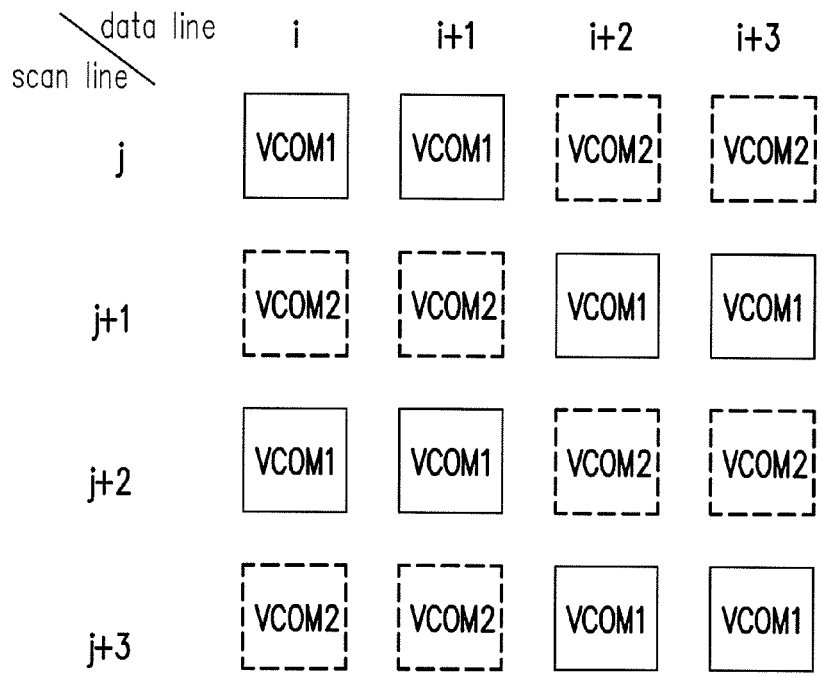
Figure 23:
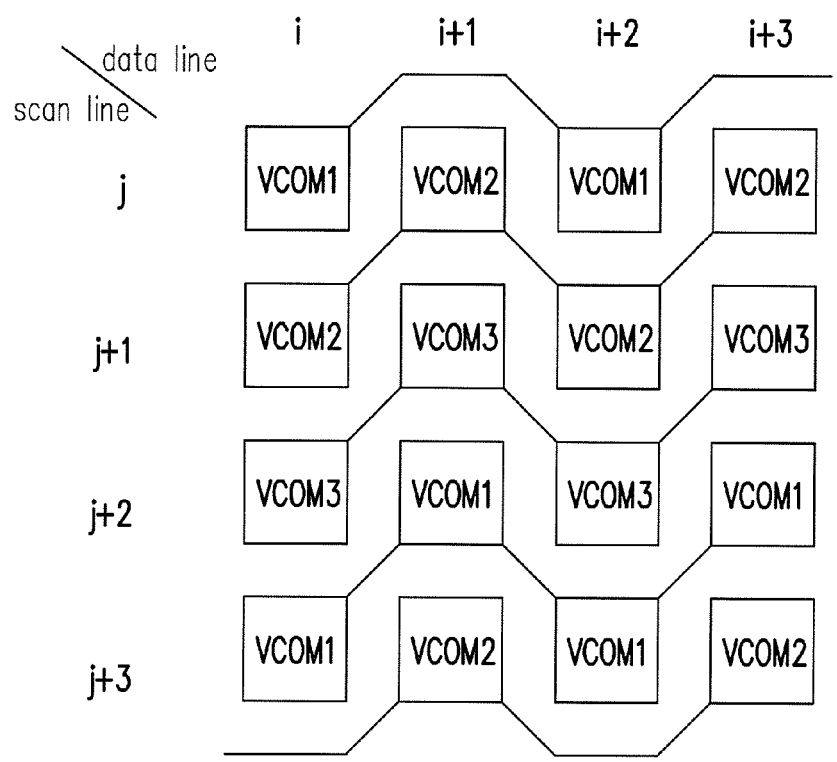
Figure 24:
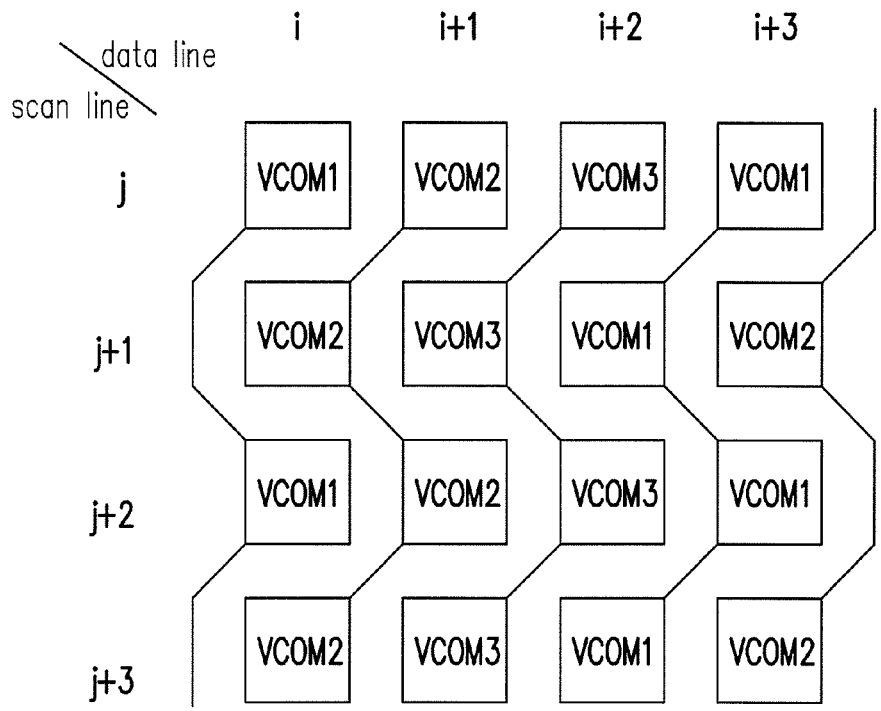
Figure 25:
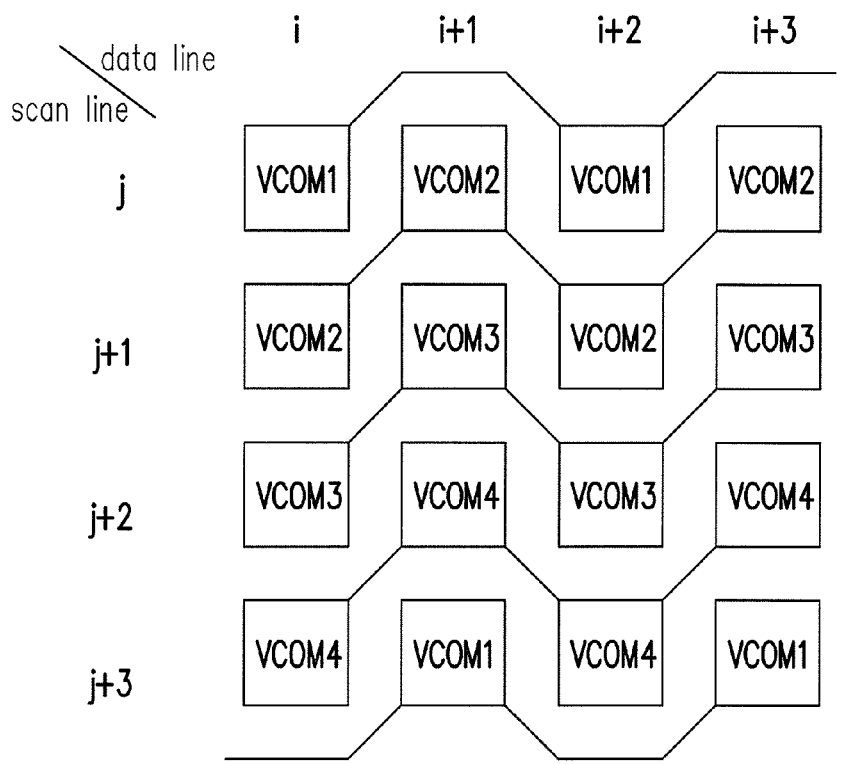
Figure 26:
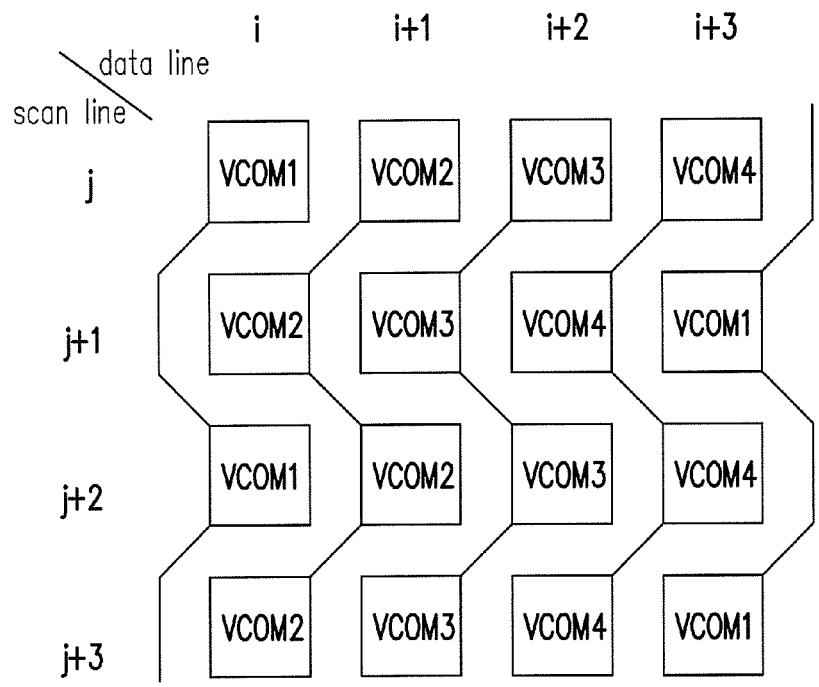
Figure 27:
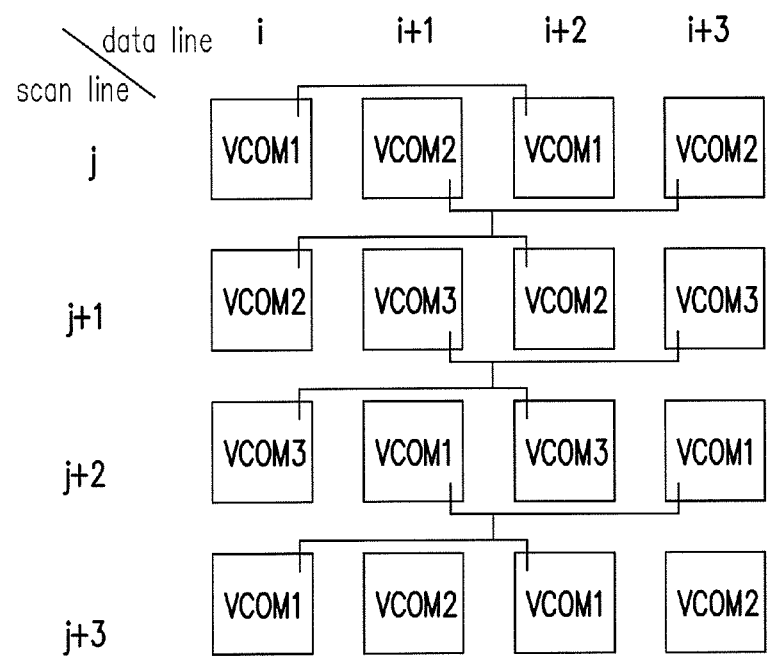
Figure 28:
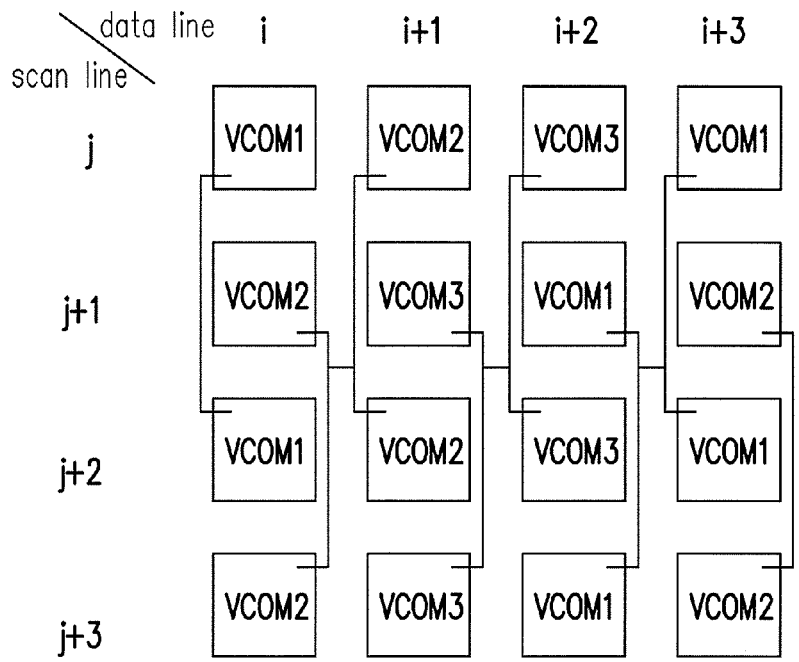
Figure 29:
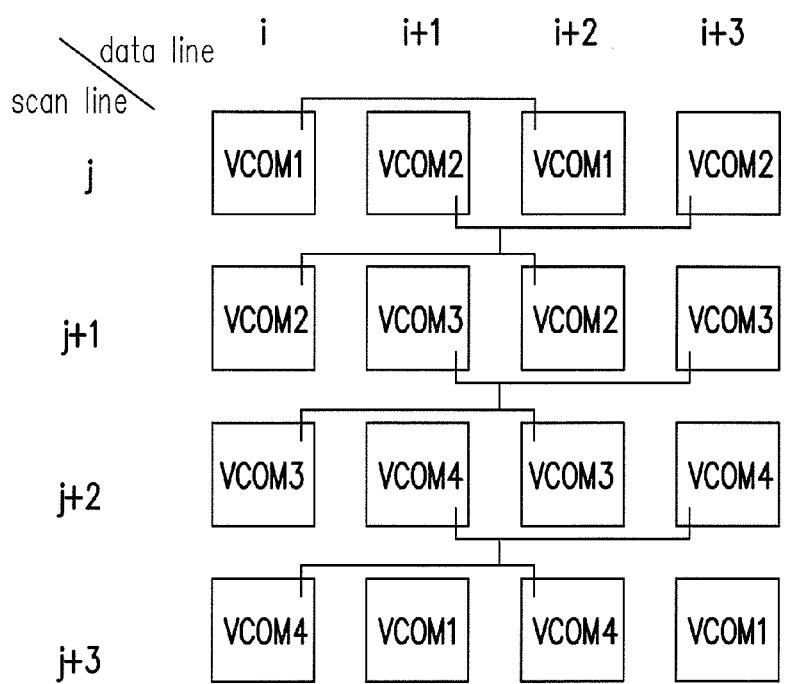
Figure 30:
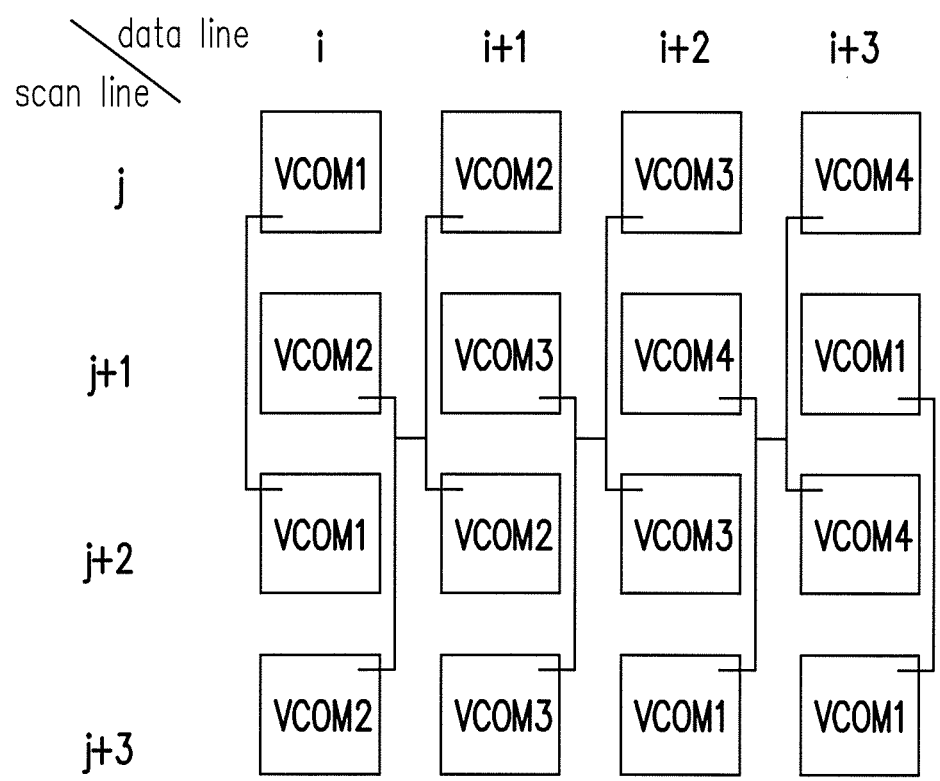

Referring to FIG. 22, in the exemplary embodiment of FIG. 22, each two adjacent pixels on the scan line are coupled to the same common electrodes. For instance, the pixel p(i, j) located on the i$^{th}$ data line and the j$^{th}$ scan line and the pixel p(i+1, j) located on the (i+1)$^{th}$ data line and the i$^{th}$ scan line are coupled to the first common electrodes. The pixel p(i, j+1) located on the i$^{th}$ data line and the (j+1)$^{th}$ scan line and the pixel p(i+1, j+1) located on the (i+1)$^{th}$ data line and the (j+1)$^{th}$ scan line are coupled to the second common electrodes. However, disposition of the wires depicted in FIG. 22 is not particularly limited in the invention.

In the foregoing exemplary embodiments depicted in FIG. 2 through FIG. 22, the liquid crystal display panel 110 includes two common electrodes which are electrically independent from each other. However, in exemplary embodiments depicted in FIG. 23 through FIG. 30, the liquid crystal display panel 110 includes three or four common electrodes. "VCOM3" marked in one pixel indicates that the corresponding pixel is coupled to a third common electrode, whereas "VCOM4" indicates that the corresponding pixel is coupled to a fourth common electrode. However, in other exemplary embodiments, the liquid crystal display panel 110 may also include more common electrodes. In the invention, an amount of the common electrodes are not limited, and a coupling relation between the pixels and the common electrodes are not limited either. The coupling relation between the pixels and the common electrodes as depicted in FIG. 23 through FIG. 30 are similar to that described in the foregoing exemplary embodiments, thus related descriptions are omitted hereinafter.

Figure 31:
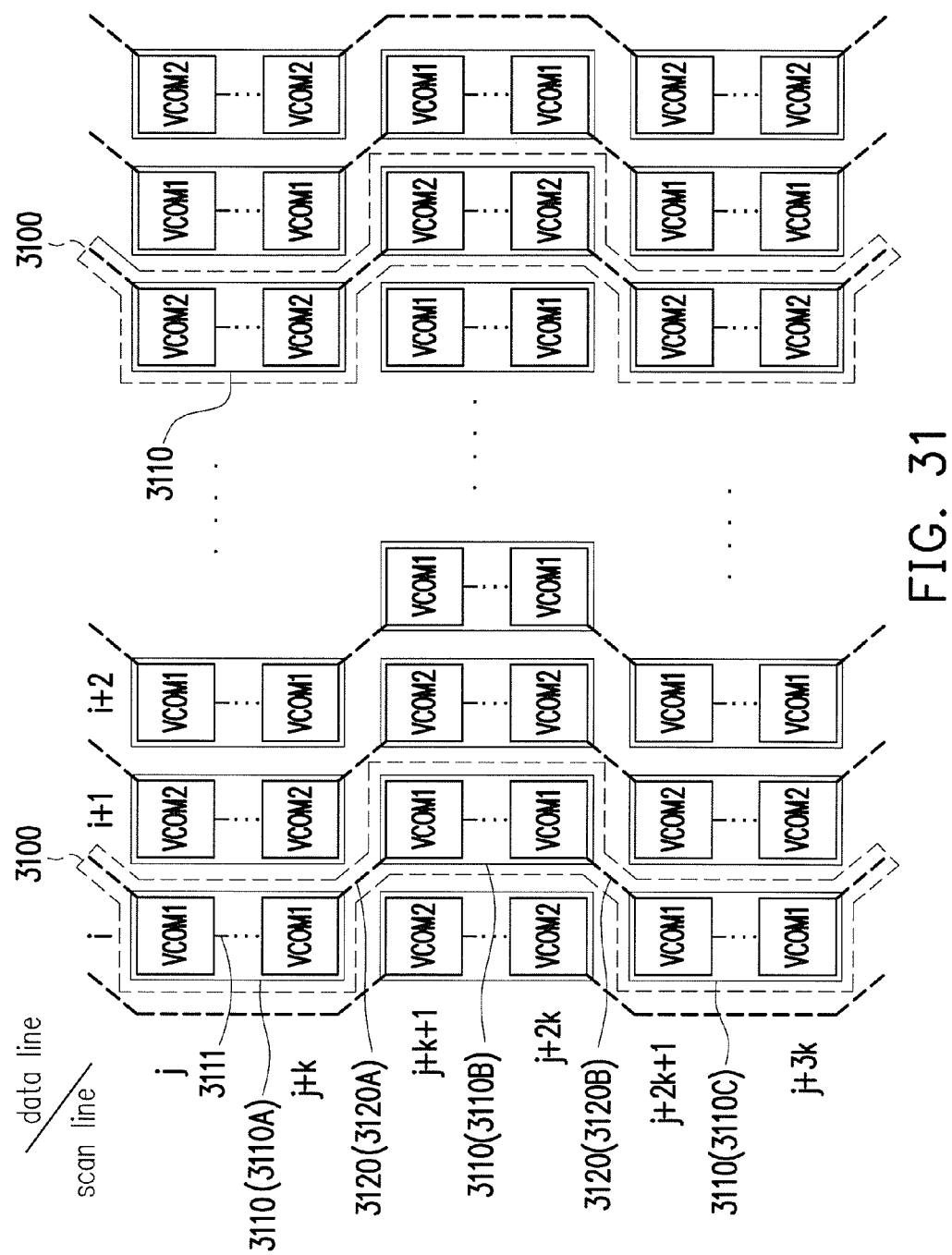

Referring to FIG. 31, in the exemplary embodiment of FIG. 31, the liquid crystal display panel 110 includes a plurality of common electrode chains 3100 arranged in a predetermined direction, e.g. the transverse direction. Each common electrode chain 3100 extends along the longitudinal direction and includes a plurality of common electrode groups 3110. The common electrode groups 3110 are coupled in series and connected via a plurality of interwires 3120. For example, the common electrode group 3110B of pixels p(i+1, j+k+1) to p(i+1, j+2k) located on the (i+1)th data line is coupled to the common electrode group 3110A of pixels p(i, j) to p(i, j+k) located on the ith data line via the interwire 3120A. The common electrode group 3110B of pixels p(i+1, j+k+1) to p(i+1, j+2k) located on the (i+1)th data line is coupled to another common electrode group 3110C of pixels p(i, j+2k+1) to p(i, j+3k) located on the ith data line via another interwire 3120B. The rest of the coupling relations are as illustrated in the figure, thus related description is omitted hereinafter.

Each of the common electrode groups 3110 includes at least two common electrodes. In the present embodiment, each of the common electrode groups 3110 includes k common electrodes, and k is a positive integer. The k common electrodes are arranged in the longitudinal direction and connected via a plurality of intrawires 3111. In the present embodiment, the pixels p(i+1, j+k+1) to p(i+1, j+2k) of the common electrode group 3110B located on the (i+1)th data line are located on different scan lines, e.g. the (j+k+1)th scan line to the (j+2k)th scan line. The pixels p(i, j) to p(i, j+k) of the common electrode group 3110A located on the ith data line are also located on different scan lines, e.g. the (j+1)th scan line to the (j+k)th scan line. In other words, different common electrode groups 3110A, 3110B, 3110C . . . of the common electrode chain 3100 are corresponding to pixels located on different scan lines. The rest of the coupling relations are as illustrated in the figure, thus related description is omitted hereinafter.

In the present embodiment, the common electrode of the common electrode group 3110B of the pixel p(i+1, j+k+1) located on the (i+1)th data line and the (j+k+1)th scan line is coupled to the common electrode of the common electrode group 3110A of the pixel p(i, j+k) located on the ith data line and the (j+k)th scan line via the interwire 3120A. The common electrode of the common electrode group 3110B of the pixel p(i+1, j+2k) located on the (i+1)th data line and the (j+2k)th scan line is coupled to the common electrode of the common electrode group 3110C of the pixel p(i, j+2k+1) located on the ith data line and the (j+2k+1)th scan line via another interwire 3120B. In other words, one of two outermost common electrodes of the common electrode group 3110B is directly coupled through the interwire 3120A to the common electrode group 3110A. The other one of the two outermost common electrodes of the common electrode group 3120B is directly coupled through the interwire 3120B to the common electrode group 3110C. The rest of the coupling relations are as illustrated in the figure, thus related description is omitted hereinafter.

Figure 32:
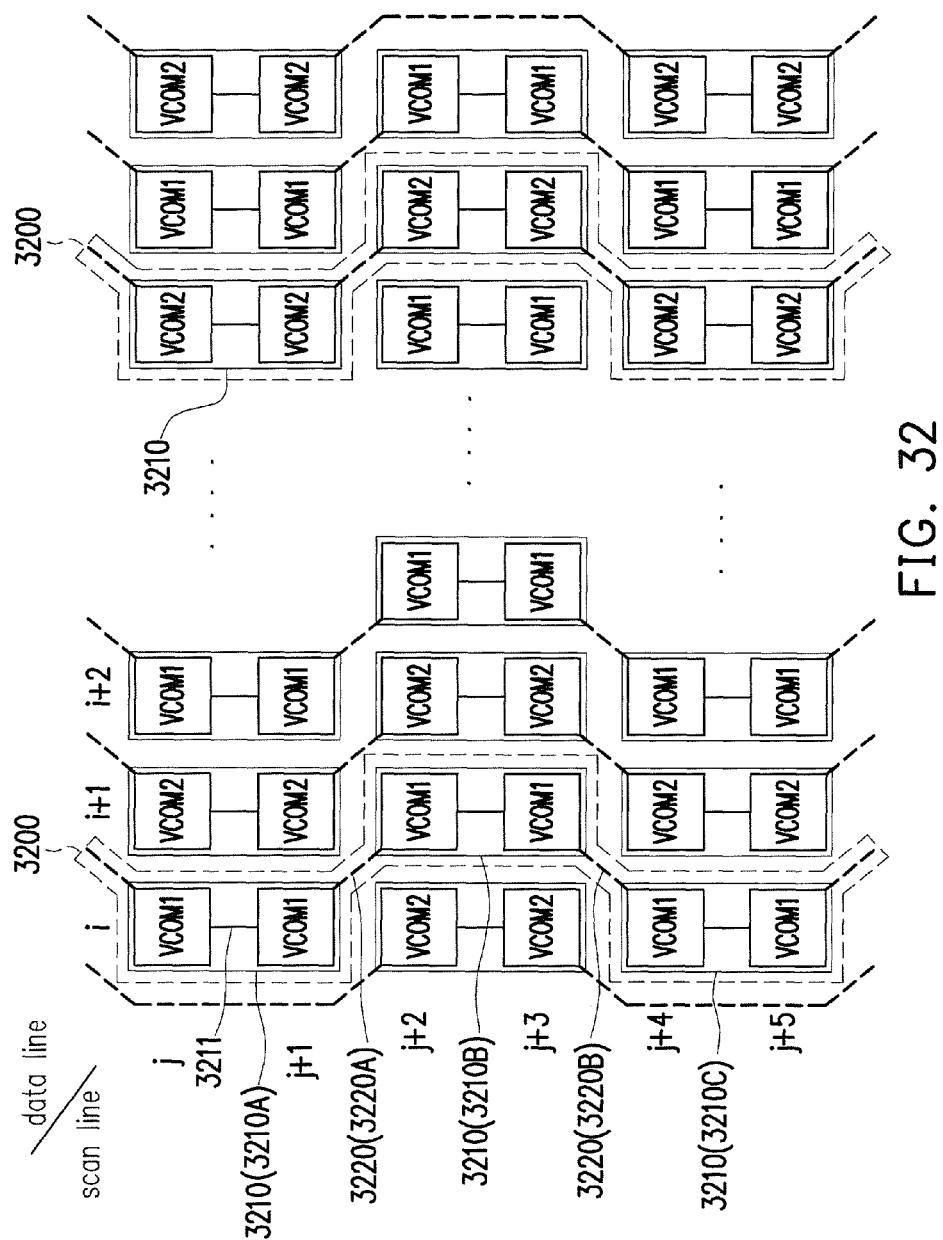

Referring to FIG. 32, in the exemplary embodiment of FIG. 32, each of the common electrode groups 3210 includes two common electrodes. The coupling relations are as illustrated in the figure, and described in this embodiment of the invention is sufficiently taught, suggested, and embodied in the embodiments illustrated in FIG. 31, and therefore no further description is provided herein.

Figure 33:
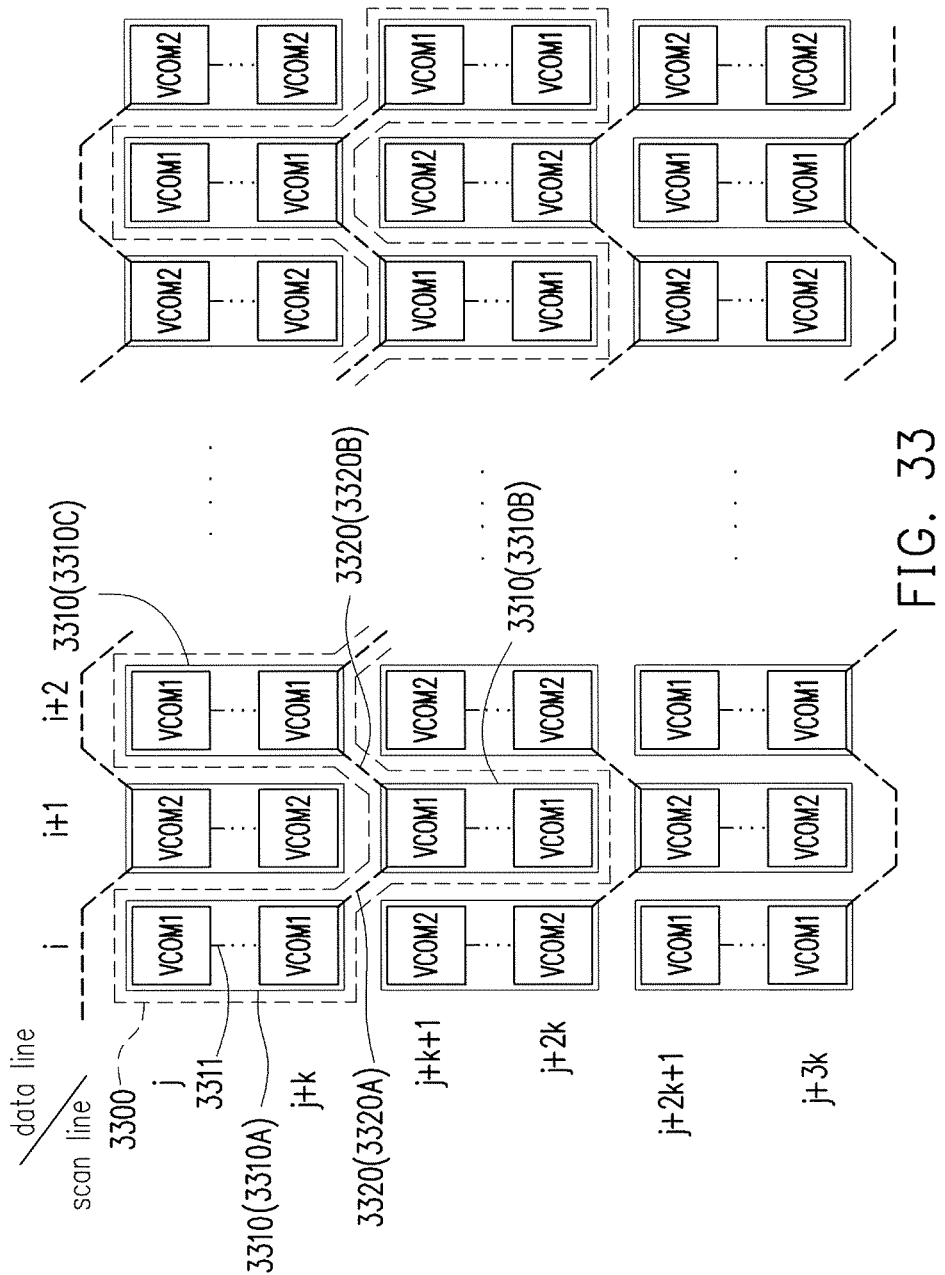

Referring to FIG. 33, in the exemplary embodiment of FIG. 33, the liquid crystal display panel 110 includes a plurality of common electrode chains 3300 arranged in a predetermined direction, e.g. the longitudinal direction. Each common electrode chain 3300 extends along the transverse direction and includes a plurality of common electrode groups 3310. The common electrode groups 3310 are coupled in series and connected via a plurality of interwires 3320. For example, the common electrode group 3310B of pixels p(i+1, j+k+1) to p(i+1, j+2k) located on the (i+1)th data line is coupled to the common electrode group 3310A of pixels p(i, j) to p(i, j+k) located on the ith data line via the interwire 3320A. The common electrode group 3310B of pixels p(i+1, j+k+1) to p(i+1, j+2k) located on the (i+1)th data line is coupled to another common electrode group 3310C of pixels p(i+2, j) to p(i+2, j+k) located on the (i+2)th data line via another interwire 3320B. The rest of the coupling relations are as illustrated in the figure, thus related description is omitted hereinafter.

Each of the common electrode groups 3310 includes at least two common electrodes. In the present embodiment, each of the common electrode groups 3310 includes k common electrodes, and k is a positive integer. The k common electrodes are arranged in the longitudinal direction and connected via a plurality of intrawires 3311. In the present embodiment, the pixels p(i+1, j+k+1) to p(i+1, j+2k) of the common electrode group 3310B are located on a first group of scan lines, (j+k+1)th to (j+2k)$^{th}$ scan lines; the pixels p(i, j) to p(i, j+k) of the common electrode group 3310A are located on a second group of scan lines, j$^{th}$ to (j+k)$^{th}$ scan lines; and the pixels p(i+2, j) to p(i+2, j+k) of the common electrode group 3310C are also located on the second group of scan lines. In the exemplary embodiment of FIG. 33, a part of common electrode groups (such as 3310A, 3310C, . . . etc.) of the common electrode chain 3300 are corresponding to pixels located on the same group of scan lines, and the other part of common electrode groups (such as 3310B, 3310D (not shown), . . . etc.) of the common electrode chain 3300 are corresponding to pixels located on the same group of scan lines. The rest of the coupling relations are as illustrated in the figure, thus related description is omitted hereinafter.

In the present embodiment, the common electrode of the common electrode group 3310B of the pixel p(i+1, j+k+1) located on the (i+1)th data line and the (j+k+1)th scan line is coupled to the common electrode of the common electrode group 3310A of the pixel p(i, j+k) located on the ith data line and the (j+k)th scan line via the interwire 3320A. The common electrode of the common electrode group 3310B of the pixel p(i+1, j+k+1) located on the (i+1)th data line and the (j+k+1)th scan line is coupled to the common electrode of the common electrode group 3310C of the pixel p(i+2, j+k) located on the (i+2)th data line and the (j+k)th scan line via another interwire 3320B. In other words, one of two outermost common electrodes of the common electrode group 3310B is directly coupled through the interwire 3320A to the common electrode group 3310A and directly coupled through the interwire 3320B to the common electrode group 3310C. The other one of the two outermost common electrodes of the common electrode group 3320B is not coupled to other common electrode groups. The rest of the coupling relations are as illustrated in the figure, thus related description is omitted hereinafter.

Figure 34:
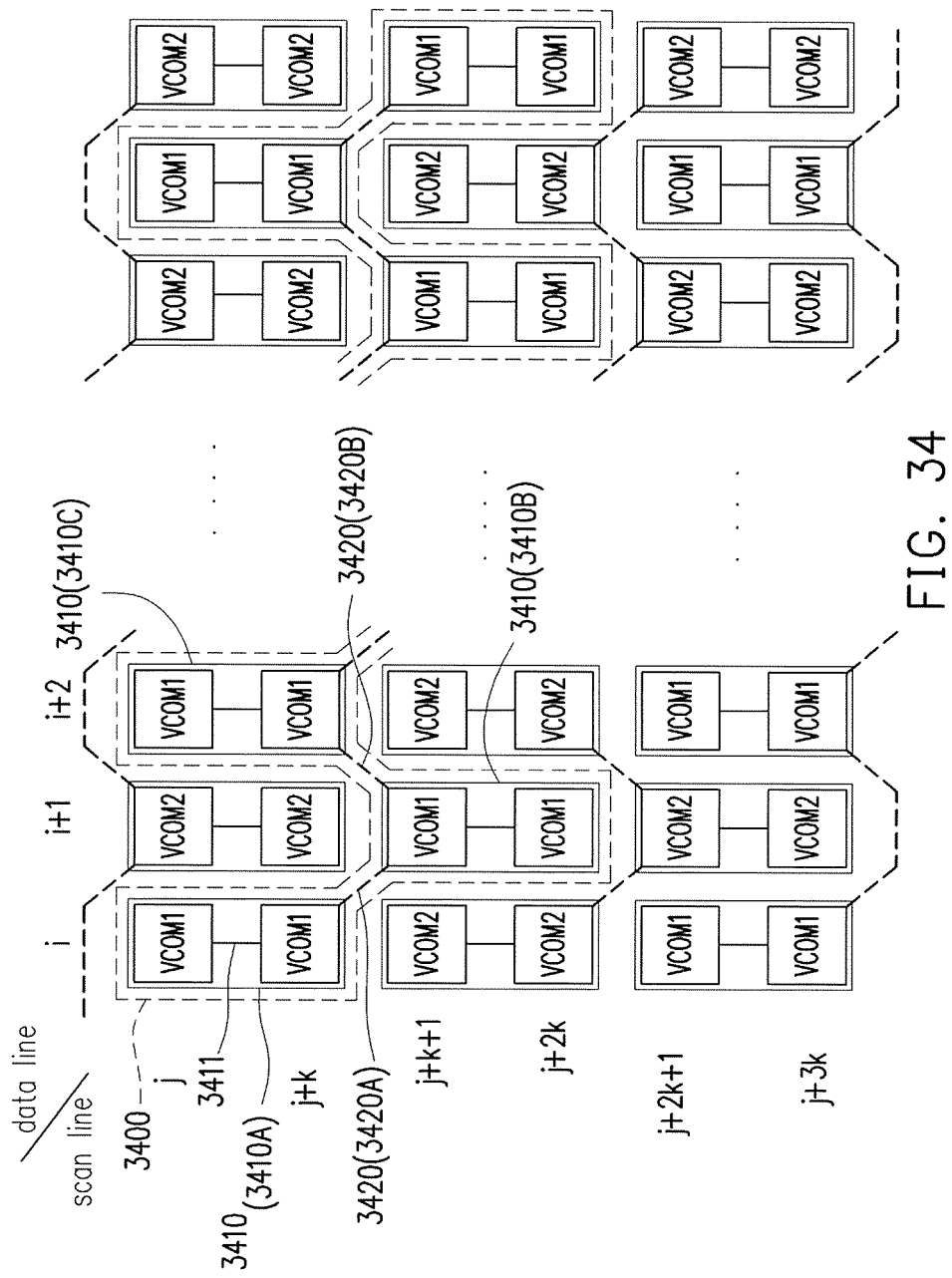

Referring to FIG. 34, in the exemplary embodiment of FIG. 34, each of the common electrode groups 3410 includes two common electrodes. The coupling relations are as illustrated in the figure, and described in this embodiment of the invention is sufficiently taught, suggested, and embodied in the embodiments illustrated in FIG. 33, and therefore no further description is provided herein.

In the foregoing exemplary embodiments depicted in FIG. 31 through FIG. 34, the liquid crystal display panel 110 includes two common electrodes which are electrically independent from each other. However, in other exemplary embodiments, the liquid crystal display panel 110 may also include more common electrodes. For instance, the liquid crystal display panel 110 may include three or four common electrodes. "VCOM3" marked in one pixel indicates that the corresponding pixel is coupled to a third common electrode, whereas "VCOM4" indicates that the corresponding pixel is coupled to a fourth common electrode as depicted in FIG. 23 through FIG. 30. In the invention, an amount of the common electrodes are not limited, and a coupling relation between the pixels and the common electrodes are not limited either.

In summary, in the exemplary embodiments of the invention, the liquid crystal display panel including more than two common electrodes which are electrically independent from each other is provided. Accordingly, usage or operation of the liquid crystal display panel is more flexible.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A liquid crystal display panel, comprising:
a plurality of common electrode chains, each comprising a plurality of common electrode groups, wherein each of the common electrode groups comprises at least two common electrodes; and
a plurality of pixels, each coupled to a corresponding common electrode of the common electrodes,
wherein the common electrode chains are arranged in a predetermined direction, which is selected from one of a first direction and a second direction, and voltages of two neighboring common electrode chains of the common electrode chains are independently configured,
wherein the at least two common electrodes of each common electrode group are arranged in the first direction, and at least one intrawire connects the at least two common electrodes of each common electrode group along the first direction,
wherein a common electrode group of pixels located on a (i+1)th data line is coupled to a common electrode group of pixels located on a ith data line via an interwire, and i is a positive integer.

2. The liquid crystal display panel of claim 1, wherein the common electrode group of the pixels located on the (i+1)th data line is coupled to another common electrode group of pixels located on the ith data line via another interwire.

3. The liquid crystal display panel of claim 2, wherein the pixels of the common electrode group located on the (i+1)th data line are located on a first group of scan lines, the pixels of the common electrode group located on the ith data line are located on a second group of scan lines comprising scan lines different from the first group of scan lines, and the pixels of the another common electrode group located on the ith data line are located on a third group of scan lines different from the first group and the second group of scan lines.

4. The liquid crystal display panel of claim 2, wherein a common electrode of the common electrode group of the pixel located on the (i+1)th data line and a (j+k+1)th scan line is coupled to a common electrode of the common electrode group of the pixel located on the ith data line and a (j+k)th scan line via the interwire, and a common electrode of the common electrode group of the pixel located on the (i+1)th data line and a (j+2k)th scan line is coupled to a common electrode of the common electrode group of the pixel located on the ith data line and a (j+2k+1)th scan line via another interwire, and j and k are positive integers.

5. The liquid crystal display panel of claim 1, wherein the common electrode group of the pixels located on the (i+1)th data line is coupled to a common electrode group of pixels located on a (i+2)th data line via another interwire.

6. The liquid crystal display panel of claim 5, wherein the pixels of the common electrode group located on the (i+1)th data line are located on a first group of scan lines, the pixels of the common electrode group located on the ith data line are located on a second group of scan lines comprising scan lines different from the first group of scan lines, and the pixels of the common electrode group located on the (i+2)th data line are located on the second group of scan lines.

7. The liquid crystal display panel of claim 5, wherein a common electrode of the common electrode group of the pixel located on the (i+1)th data line and a (j+k+1)th scan line is coupled to a common electrode of the common electrode group of the pixel located on the ith data line and a (j+k)th scan line via the interwire, and a common electrode of the common electrode group of the pixel located on the (i+1)th data line and the (j+k+1)th scan line is coupled to a common electrode of the common electrode group of the pixel located on the (i+2)th data line and the (j+k)th scan line via another interwire, and j and k are positive integers.

8. A liquid crystal display panel, comprising:
a plurality of first common electrodes;
a plurality of second common electrodes, wherein voltage of the first common electrodes and voltage of the second common electrodes are independently configured; and
a plurality of pixels, wherein each of the pixels is coupled to a common electrode which is either the first common electrode or the second common electrode,
wherein the first common electrode of a pixel located on a ith data line and a jth scan line is directly coupled to the first common electrode of a pixel located on the ith data line and a (j+2)th scan line through a first wire, and the second common electrode of a pixel located on the ith data line and a (j+1)th scan line is directly coupled to the second common electrode of a pixel located on the ith data line and a (j+3)th scan line through a second wire, wherein the first wire is distinct from the second wire, and i and j are positive integers.

9. The liquid crystal display panel of claim 8, wherein the second common electrode of a pixel located on a (i+1)th data line and the jth scan line is directly coupled to the second common electrode of a pixel located on the (i+1)th data line and the (j+2)th scan line through a third wire, and the first common electrode of a pixel located on the (i+1)th data line and the (j+1)th scan line is directly coupled to the first common electrode of a pixel located on the (i+1)th data line and the (j+3)th scan line through a fourth wire, wherein the third wire is distinct from the fourth wire, and the second wire and the third wire are neighboring.

10. The liquid crystal display panel of claim 9, wherein the second wire and the third wire are coupled.

11. The liquid crystal display panel of claim 8, wherein the second common electrode of a pixel located on a (i+1)th data line and the jth scan line is directly coupled to the second common electrode of a pixel located on the (i+1)th data line and the (j+2)th scan line through a third wire, and the first common electrode of a pixel located on the (i+1)th data line and the (j+1)th scan line is directly coupled to the first common electrode of a pixel located on the (i+1)th data line and the (j+3)th scan line through a fourth wire, wherein the third wire is distinct from the fourth wire, and the second wire and the fourth wire are neighboring.

12. The liquid crystal display panel of claim 8, wherein the first common electrode of a pixel located on a (i+1)th data line and the (j+1)th scan line is directly coupled to the first common electrode of a pixel located on the (i+1)th data line and the (j+3)th scan line through a third wire, and the second common electrode of a pixel located on the (i+1)th data line and the jth scan line is directly coupled to the second common electrode of a pixel located on the (i+1)th data line and the (j+2)th scan line through a fourth wire, wherein the third wire is distinct from the fourth wire, and the first wire and the third wire are neighboring.

13. The liquid crystal display panel of claim 12, wherein the first wire and the third wire are coupled.

14. The liquid crystal display panel of claim 8, wherein the first wire and the second wire are disposed in the same layer as that the first common electrodes and the second common electrodes are disposed, and the first wire and the second wire are disposed on a region excluding the first common electrodes and second common electrodes.

15. The liquid crystal display panel of claim 8, wherein the first wire and the second wire are disposed in a layer different from that the first common electrodes and the second common electrode are disposed.

16. A liquid crystal display panel, comprising:
a plurality of first common electrodes;
a plurality of second common electrodes, wherein voltage of the first common electrodes and voltage of the second common electrodes are independently configured; and
a plurality of pixels, wherein each of the pixels is coupled to a common electrode which is either the first common electrode or the second common electrode,
wherein the first common electrode of a pixel located on a ith data line and a jth scan line is directly coupled to the first common electrode of a pixel located on a (i+2)th data line and a jth scan line through a first wire, and the second common electrode of the pixel located on a (i+1)th data line and the jth scan line is directly coupled to the second common electrode of a pixel located on an (i+3)th data line and the jth scan line through a second wire, wherein the first wire is distinct from the second wire, and i and j are positive integers.

17. The liquid crystal display panel of claim 16, wherein the second common electrode of a pixel located on the ith data line and a (j+1) h scan line is directly coupled to the second common electrode of a pixel located on the (i+2)th data line and the (j+1)th scan line through a third wire, and the first common electrode of a pixel located on the (i+1)th data line and the (j+1)th scan line is directly coupled to the first common electrode of a pixel located on the (i+3)th data line and the (j+1)th scan line through a fourth wire, wherein the third wire is distinct from the fourth wire, and the second wire and the third wire are neighboring.

18. The liquid crystal display panel of claim 17, wherein the second wire and the third wire are coupled.

19. The liquid crystal display panel of claim 16, wherein the second common electrode of a pixel located on the ith data line and a (j+1)th scan line is directly coupled to the second common electrode of a pixel located on the (i+2)th data line and the (j+1)th scan line through a third wire, and the first common electrode of a pixel located on the (i+1)th data line and the (j+1)th scan line is directly coupled to the first common electrode of a pixel located on the (i+3)th data line and the (j+1)th scan line through a fourth wire, wherein the third wire is distinct from the fourth wire, and the second wire and the fourth wire are neighboring.

20. The liquid crystal display panel of claim 16, wherein the first common electrode of a pixel located on the (i+1)th data line and a (j+1)th scan line is directly coupled to the first common electrode of a pixel located on the (i+3)th data line and the (j+1)th scan line through a third wire, and the second common electrode of a pixel located on the ith data line and the (j+1)th scan line is directly coupled to the second common electrode of a pixel located on the (i+2)th data line and a (j+1)th scan line through a fourth wire, wherein the third wire is distinct from the fourth wire, and the first wire and the third wire are neighboring.

21. The liquid crystal display panel of claim 20, wherein the first wire and the third wire are coupled.

22. The liquid crystal display panel of claim 16, wherein the first wire and the second wire are disposed in the same layer as that the first common electrodes and the second common electrodes are disposed, and the first wire and the second wire are disposed on a region excluding the first common electrodes and second common electrodes.

23. The liquid crystal display panel of claim 16, wherein the first wire and the second wire are disposed in a layer different from that the first common electrodes and the second common electrode are disposed.

* * * * *